(12) United States Patent
Friesen et al.

(10) Patent No.: US 11,858,835 B2
(45) Date of Patent: Jan. 2, 2024

(54) SYSTEMS FOR CONTROLLED TREATMENT OF WATER WITH OZONE AND RELATED METHODS THEREFOR

(71) Applicant: Source Global, PBC, Scottsdale, AZ (US)

(72) Inventors: Cody Friesen, Scottsdale, AZ (US); Paul Johnson, Scottsdale, AZ (US); Jonathan Goldberg, Scottsdale, AZ (US)

(73) Assignee: Source Global, PBC, Scottsdale, AZ (US)

( * ) Notice: Subject to any disclaimer, the term of this patent is extended or adjusted under 35 U.S.C. 154(b) by 0 days.

(21) Appl. No.: 17/899,416

(22) Filed: Aug. 30, 2022

(65) Prior Publication Data

US 2022/0411297 A1 Dec. 29, 2022

Related U.S. Application Data

(63) Continuation of application No. 16/630,824, filed as application No. PCT/US2018/042098 on Jul. 13, 2018, now Pat. No. 11,447,407.

(Continued)

(51) Int. Cl.
*C02F 1/78* (2023.01)
*B01D 53/26* (2006.01)
*C02F 1/00* (2023.01)

(52) U.S. Cl.
CPC .............. *C02F 1/78* (2013.01); *B01D 53/26* (2013.01); *C02F 1/008* (2013.01);
(Continued)

(58) Field of Classification Search
None
See application file for complete search history.

(56) References Cited

U.S. PATENT DOCUMENTS

| 1,816,592 | A | 7/1931 | Knapen |
| 2,138,689 | A | 11/1938 | Altenkirch |
(Continued)

FOREIGN PATENT DOCUMENTS

| CN | 1592831 | 3/2005 |
| CN | 101278164 | 3/2005 |
(Continued)

OTHER PUBLICATIONS

Non-Final Office Action dated Jan. 17, 2020 in U.S. Appl. No. 15/528,366.
(Continued)

*Primary Examiner* — Richard C Gurtowski
(74) *Attorney, Agent, or Firm* — Snell & Wilmer L.L.P.

(57) ABSTRACT

This disclosure relates to systems and methods for controlling treatment of water with ozone. The systems and methods can utilize one or more processing modules and one or more non-transitory storage modules that are configured to store computing instructions. Execution of the instructions can cause the one or more processing modules to perform acts of: generating ozone; and applying the ozone to water. The act of generating the ozone can include: controlling a quantity of the ozone generated; and controlling when the ozone is generated.

20 Claims, 13 Drawing Sheets

Related U.S. Application Data

(60) Provisional application No. 62/532,973, filed on Jul. 14, 2017.

(52) U.S. Cl.
CPC .. *C02F 2201/009* (2013.01); *C02F 2201/782* (2013.01); *C02F 2209/02* (2013.01); *C02F 2209/23* (2013.01)

(56) References Cited

U.S. PATENT DOCUMENTS

| | | |
|---|---|---|
| 2,284,914 A | 6/1942 | Miller |
| 2,462,952 A | 3/1949 | Dunkak |
| 2,700,537 A | 1/1955 | Pennington |
| 2,761,292 A | 9/1956 | Coanda et al. |
| 3,102,532 A | 9/1963 | Shoemaker |
| 3,400,515 A | 9/1968 | Ackerman |
| 3,676,321 A | 7/1972 | Cummings et al. |
| 3,683,591 A | 8/1972 | Glav |
| 3,726,778 A | 4/1973 | Seltzer et al. |
| 3,740,959 A | 6/1973 | Foss |
| 3,844,737 A | 10/1974 | Macriss et al. |
| 3,889,532 A | 6/1975 | Pilie et al. |
| 3,889,742 A | 6/1975 | Rush et al. |
| 4,054,124 A | 10/1977 | Knoos |
| 4,080,186 A | 3/1978 | Ockert |
| 4,117,831 A | 10/1978 | Bansal et al. |
| 4,134,743 A | 1/1979 | Macriss et al. |
| 4,136,672 A | 1/1979 | Hallanger |
| 4,146,372 A | 3/1979 | Groth et al. |
| 4,169,459 A | 10/1979 | Ehrlich |
| 4,185,969 A | 1/1980 | Bulang |
| 4,201,195 A | 5/1980 | Sakhuja |
| 4,219,341 A | 8/1980 | Hussmann |
| 4,222,244 A | 9/1980 | Meckler |
| 4,234,037 A | 11/1980 | Rogers et al. |
| 4,242,112 A | 12/1980 | Jebens |
| 4,285,702 A | 8/1981 | Michel et al. |
| 4,304,577 A | 12/1981 | Ito et al. |
| 4,315,599 A | 2/1982 | Biancardi |
| 4,334,524 A | 6/1982 | McCullough |
| 4,342,569 A | 8/1982 | Hussmann |
| 4,345,917 A | 8/1982 | Hussmann |
| 4,351,651 A | 9/1982 | Courneya |
| 4,374,655 A | 2/1983 | Grodzka et al. |
| 4,377,398 A | 3/1983 | Bennett |
| 4,398,927 A | 8/1983 | Asher et al. |
| 4,405,343 A | 9/1983 | Othmer |
| 4,433,552 A | 2/1984 | Smith |
| 4,478,210 A | 10/1984 | Sieradski |
| 4,722,192 A | 2/1988 | Koblitz et al. |
| 4,726,817 A | 2/1988 | Roger |
| 4,926,618 A | 5/1990 | Ratliff |
| 5,058,388 A | 10/1991 | Shaw et al. |
| 5,123,777 A | 6/1992 | Tadros |
| 5,148,374 A | 9/1992 | Coellner |
| 5,213,773 A * | 5/1993 | Burris ............... B01D 19/0005 210/138 |
| 5,275,643 A | 1/1994 | Usui |
| 5,470,484 A | 11/1995 | McNeel |
| 5,579,647 A | 12/1996 | Calton et al. |
| 5,701,749 A | 12/1997 | Zakryk |
| 5,718,122 A | 2/1998 | Maeda |
| 5,729,981 A | 3/1998 | Markus et al. |
| 5,758,511 A | 6/1998 | Yoho et al. |
| 5,826,434 A | 10/1998 | Belding et al. |
| 5,846,296 A | 12/1998 | Krumsvik |
| 5,873,256 A | 2/1999 | Denniston |
| 5,989,313 A | 11/1999 | Mize |
| 6,029,467 A | 2/2000 | Moratalla |
| 6,156,102 A | 12/2000 | Contad et al. |
| 6,199,388 B1 | 3/2001 | Fischer, Jr. |
| 6,336,957 B1 | 1/2002 | Tsymerman |
| 6,447,583 B1 | 9/2002 | Thelen et al. |
| 6,490,879 B1 | 12/2002 | Lloyd et al. |
| 6,511,525 B2 | 1/2003 | Spletzer et al. |
| 6,513,339 B1 | 2/2003 | Kopko |
| 6,557,365 B2 | 5/2003 | Dinnage et al. |
| 6,574,979 B2 | 6/2003 | Faqih |
| 6,644,060 B1 | 11/2003 | Dagan |
| 6,828,499 B2 | 12/2004 | Max |
| 6,869,464 B2 | 3/2005 | Klemic |
| 6,945,063 B2 | 9/2005 | Max |
| 6,957,543 B1 | 10/2005 | Reznik |
| 7,017,356 B2 | 3/2006 | Moffitt |
| 7,043,934 B2 | 5/2006 | Radermacher et al. |
| 7,178,355 B2 | 2/2007 | Moffitt |
| 7,251,945 B2 | 8/2007 | Tongue |
| 7,305,849 B2 | 12/2007 | Loffler et al. |
| 7,306,654 B2 | 12/2007 | King et al. |
| 7,478,535 B2 | 1/2009 | Turner, Jr. et al. |
| 7,740,765 B2 | 6/2010 | Mitchell |
| 7,866,176 B2 | 1/2011 | Vetrovec et al. |
| 7,905,097 B1 | 3/2011 | Fort |
| 7,926,481 B2 | 4/2011 | Edwards et al. |
| 8,075,652 B2 | 12/2011 | Melikyan |
| 8,118,912 B2 | 2/2012 | Rodriguez et al. |
| 8,187,368 B2 | 5/2012 | Shih |
| 8,196,422 B2 | 6/2012 | Ritchey |
| 8,328,904 B2 | 12/2012 | Griffiths et al. |
| 8,425,660 B2 | 4/2013 | Ike et al. |
| 8,506,675 B2 | 8/2013 | Ellsworth |
| 8,844,299 B2 | 9/2014 | Ferreira et al. |
| 8,876,956 B2 | 11/2014 | Ball et al. |
| 9,289,718 B2 | 3/2016 | Dahlback |
| 10,357,739 B2 | 7/2019 | Friesen et al. |
| 10,469,028 B2 | 11/2019 | Friesen et al. |
| 10,632,416 B2 | 4/2020 | Friesen et al. |
| 10,835,861 B2 | 11/2020 | Friesen et al. |
| 11,159,123 B2 | 10/2021 | Friesen et al. |
| 11,160,223 B2 | 11/2021 | Friesen et al. |
| 11,266,944 B2 | 3/2022 | Friesen et al. |
| 11,281,997 B2 | 3/2022 | Friesen et al. |
| 11,285,435 B2 | 3/2022 | Friesen et al. |
| 11,359,356 B2 | 6/2022 | Friesen et al. |
| 11,384,517 B2 | 7/2022 | Friesen et al. |
| 11,414,843 B2 | 8/2022 | Friesen et al. |
| 11,447,407 B2 * | 9/2022 | Friesen .................. B01D 53/26 |
| 11,555,421 B2 | 1/2023 | Friesen et al. |
| 2002/0046569 A1 | 4/2002 | Faqih |
| 2002/0130091 A1 | 9/2002 | Ekberg et al. |
| 2003/0091881 A1 | 5/2003 | Eisler |
| 2003/0101161 A1 | 5/2003 | Ferguson et al. |
| 2004/0000165 A1 | 1/2004 | Max |
| 2004/0055309 A1 | 3/2004 | Bellows et al. |
| 2005/0044862 A1 | 3/2005 | Vetrovec et al. |
| 2005/0084415 A1 | 4/2005 | McVey et al. |
| 2005/0204914 A1 | 9/2005 | Boutall |
| 2005/0249631 A1 | 11/2005 | Schulz et al. |
| 2005/0284167 A1 | 12/2005 | Morgan |
| 2006/0017740 A1 | 1/2006 | Coleman |
| 2006/0032493 A1 | 2/2006 | Ritchey |
| 2006/0060475 A1 | 3/2006 | Applegate et al. |
| 2006/0112709 A1 | 6/2006 | Boyle |
| 2006/0130654 A1 | 6/2006 | King et al. |
| 2006/0288709 A1 | 12/2006 | Reidy |
| 2007/0028769 A1 | 2/2007 | Eplee et al. |
| 2007/0101862 A1 | 5/2007 | Tongue |
| 2007/0150424 A1 | 6/2007 | Igelnik |
| 2007/0274858 A1 | 11/2007 | Childers et al. |
| 2007/0295021 A1 | 12/2007 | Tyls et al. |
| 2008/0022694 A1 | 1/2008 | Anderson et al. |
| 2008/0135495 A1 | 6/2008 | Sher |
| 2008/0168789 A1 | 7/2008 | Jones |
| 2008/0202944 A1 | 8/2008 | Santoli et al. |
| 2008/0224652 A1 | 9/2008 | Zhu et al. |
| 2008/0245092 A1 | 10/2008 | Forsberg et al. |
| 2008/0289352 A1 | 11/2008 | Parent |
| 2009/0025711 A1 | 1/2009 | Edwards et al. |
| 2009/0093916 A1 | 4/2009 | Parsonnet et al. |
| 2009/0173376 A1 | 7/2009 | Spencer et al. |
| 2009/0221276 A1 | 8/2009 | Forkosh |
| 2009/0223236 A1 | 9/2009 | Call et al. |

(56) References Cited

U.S. PATENT DOCUMENTS

| | | |
|---|---|---|
| 2009/0223514 A1 | 9/2009 | Smith et al. |
| 2009/0283464 A1 | 11/2009 | Oe et al. |
| 2010/0083673 A1 | 4/2010 | Meritt |
| 2010/0170499 A1 | 7/2010 | Bar |
| 2010/0192605 A1 | 8/2010 | Fang et al. |
| 2010/0212348 A1* | 8/2010 | Oh .................... B01D 53/323 165/104.31 |
| 2010/0242507 A1 | 9/2010 | Meckler |
| 2010/0275629 A1 | 11/2010 | Erickson |
| 2010/0275775 A1 | 11/2010 | Griffiths et al. |
| 2010/0294672 A1 | 11/2010 | Gahr et al. |
| 2010/0300868 A1 | 12/2010 | Pirone |
| 2011/0048039 A1 | 3/2011 | Kohavi et al. |
| 2011/0056220 A1 | 3/2011 | Caggiano |
| 2011/0083458 A1 | 4/2011 | Takakura et al. |
| 2011/0132027 A1 | 6/2011 | Gommed et al. |
| 2011/0232485 A1 | 9/2011 | Ellsworth |
| 2011/0247353 A1 | 10/2011 | Metz |
| 2011/0296858 A1 | 12/2011 | Caggiano |
| 2012/0006193 A1 | 1/2012 | Roychoudhury |
| 2012/0125020 A1 | 5/2012 | Vandermeulen et al. |
| 2012/0227582 A1 | 9/2012 | Wamstad et al. |
| 2013/0042642 A1 | 2/2013 | Ferreira et al. |
| 2013/0227879 A1 | 9/2013 | Lehky |
| 2013/0269522 A1 | 10/2013 | DeValve |
| 2013/0312451 A1 | 11/2013 | Max |
| 2013/0318790 A1 | 12/2013 | Becze et al. |
| 2013/0319022 A1 | 12/2013 | Becze et al. |
| 2014/0034475 A1 | 2/2014 | Kamen et al. |
| 2014/0053580 A1 | 2/2014 | Ferreira et al. |
| 2014/0110273 A1 | 4/2014 | Bar-Or et al. |
| 2014/0138236 A1 | 5/2014 | White |
| 2014/0157985 A1 | 6/2014 | Scovazzo et al. |
| 2014/0173769 A1 | 6/2014 | Leyns et al. |
| 2014/0260389 A1 | 9/2014 | Sistla |
| 2014/0317029 A1 | 10/2014 | Matsuoka et al. |
| 2015/0033774 A1 | 2/2015 | Ferreira et al. |
| 2015/0136666 A1 | 5/2015 | Zamir et al. |
| 2015/0194926 A1 | 7/2015 | Bushong, Jr. |
| 2016/0073589 A1 | 3/2016 | McNamara |
| 2016/0131401 A1 | 5/2016 | Otanicar et al. |
| 2016/0162456 A1 | 6/2016 | Munro et al. |
| 2016/0187287 A1 | 6/2016 | Tajiri et al. |
| 2016/0197364 A1 | 7/2016 | Rama |
| 2016/0209346 A1 | 7/2016 | Brondum et al. |
| 2016/0244951 A1 | 8/2016 | Yui |
| 2016/0333553 A1 | 11/2016 | Dorfman |
| 2017/0013810 A1 | 1/2017 | Grabell |
| 2017/0024641 A1 | 1/2017 | Wierzynski |
| 2017/0203974 A1 | 7/2017 | Riedl et al. |
| 2017/0323221 A1 | 11/2017 | Chaudhuri et al. |
| 2017/0354920 A1 | 12/2017 | Friesen et al. |
| 2017/0371544 A1 | 12/2017 | Choi et al. |
| 2018/0043295 A1 | 2/2018 | Friesen et al. |
| 2018/0209123 A1 | 7/2018 | Bahrami et al. |
| 2019/0025273 A1 | 1/2019 | Brondum |
| 2019/0102695 A1 | 4/2019 | Biswas et al. |
| 2019/0171967 A1 | 6/2019 | Friesen et al. |
| 2019/0254243 A1 | 8/2019 | Friesen et al. |
| 2019/0336907 A1 | 11/2019 | Friesen et al. |
| 2019/0344214 A1 | 11/2019 | Friesen et al. |
| 2019/0372520 A1 | 12/2019 | Friesen et al. |
| 2020/0049682 A1 | 2/2020 | Fukuzawa et al. |
| 2020/0055753 A1 | 2/2020 | Minor et al. |
| 2020/0108344 A1 | 4/2020 | Vollmer et al. |
| 2020/0122083 A1 | 4/2020 | Friesen et al. |
| 2020/0124566 A1 | 4/2020 | Johnson et al. |
| 2020/0140299 A1 | 5/2020 | Friesen et al. |
| 2020/0209190 A1 | 7/2020 | Johnson et al. |
| 2020/0269184 A1 | 8/2020 | Friesen et al. |
| 2020/0283997 A1 | 9/2020 | Salloum et al. |
| 2020/0286997 A1 | 9/2020 | Wu et al. |
| 2020/0300128 A1 | 9/2020 | Friesen et al. |
| 2020/0361965 A1 | 11/2020 | Yaghi et al. |
| 2021/0062478 A1 | 3/2021 | Friesen et al. |
| 2021/0300804 A1 | 9/2021 | Broga et al. |
| 2021/0305935 A1 | 9/2021 | Friesen et al. |
| 2022/0039341 A1 | 2/2022 | Friesen et al. |
| 2022/0127172 A1 | 4/2022 | Friesen et al. |
| 2022/0136270 A1 | 5/2022 | Gamboa et al. |
| 2022/0156648 A1 | 5/2022 | Friesen et al. |
| 2022/0176314 A1 | 6/2022 | Friesen et al. |
| 2022/0228351 A1 | 7/2022 | Friesen et al. |
| 2022/0259838 A1 | 8/2022 | Friesen et al. |
| 2022/0274048 A1 | 9/2022 | Friesen et al. |
| 2022/0307240 A1 | 9/2022 | Friesen et al. |
| 2022/0316192 A1 | 10/2022 | Friesen et al. |
| 2022/0341134 A1 | 10/2022 | Friesen et al. |
| 2022/0411297 A1 | 12/2022 | Friesen et al. |
| 2023/0014032 A1 | 1/2023 | Friesen et al. |
| 2023/0078132 A1 | 3/2023 | Friesen et al. |
| 2023/0113840 A1 | 4/2023 | Friesen et al. |
| 2023/0130872 A1 | 4/2023 | Friesen et al. |

FOREIGN PATENT DOCUMENTS

| | | |
|---|---|---|
| CN | 1774401 | 5/2006 |
| CN | 101589282 | 11/2009 |
| CN | 102042645 | 5/2011 |
| CN | 102297503 | 12/2011 |
| CN | 102422089 | 4/2012 |
| CN | 102441320 | 5/2012 |
| CN | 102733451 | 10/2012 |
| CN | 202850099 | 4/2013 |
| CN | 103889892 | 6/2014 |
| CN | 203777907 | 8/2014 |
| CN | 104813107 | 7/2015 |
| CN | 204510348 U | 7/2015 |
| CN | 105531547 | 4/2016 |
| CN | 107447811 | 12/2017 |
| DE | 4215839 | 11/1993 |
| EP | 1139554 | 10/2001 |
| EP | 2305362 | 4/2011 |
| EP | 2326890 | 6/2011 |
| FR | 2813087 | 2/2002 |
| GB | 2237387 | 5/1991 |
| JP | H06142434 | 5/1994 |
| JP | H09-285412 | 11/1997 |
| JP | 2002-126441 | 5/2002 |
| JP | 2003-148786 | 5/2003 |
| JP | 2004-239541 | 8/2004 |
| JP | 3850498 | 11/2006 |
| JP | 2012101169 | 5/2012 |
| KR | 20000003525 | 2/2000 |
| WO | 1999007951 | 2/1999 |
| WO | 2006129200 | 12/2006 |
| WO | 2007041804 | 4/2007 |
| WO | 2007051886 | 5/2007 |
| WO | 2008018071 | 2/2008 |
| WO | 2009043413 | 4/2009 |
| WO | 2012009024 | 1/2012 |
| WO | 2012128619 | 9/2012 |
| WO | 2012162760 | 12/2012 |
| WO | 2013026126 | 2/2013 |
| WO | 2013182911 | 12/2013 |
| WO | 2014085860 | 6/2014 |
| WO | 2015054435 | 4/2015 |
| WO | 2016053162 | 4/2016 |
| WO | 2016081863 | 5/2016 |
| WO | 2016138075 | 9/2016 |
| WO | 2016187709 | 12/2016 |
| WO | 2017177143 | 10/2017 |
| WO | 2017201405 | 11/2017 |
| WO | 2018013161 | 1/2018 |
| WO | 2019014599 | 1/2019 |
| WO | 2019050861 | 3/2019 |
| WO | 2019050866 | 3/2019 |
| WO | 2019071202 | 4/2019 |
| WO | 2019113354 | 6/2019 |
| WO | 2019161339 | 8/2019 |
| WO | 2019217974 | 11/2019 |
| WO | 2020082038 | 4/2020 |
| WO | 2020086621 | 4/2020 |
| WO | 2020219604 | 4/2020 |

(56) References Cited

FOREIGN PATENT DOCUMENTS

| WO | 2021154739 | 8/2021 |
|---|---|---|
| WO | 2022093999 | 5/2022 |
| WO | 2023059834 | 4/2023 |

OTHER PUBLICATIONS

Final Office Action dated Apr. 27, 2020 in U.S. Appl. No. 15/528,366.
Notice of Allowance dated Jun. 19, 2020 in U.S. Appl. No. 15/528,366.
Notice of Allowance dated Jun. 3, 2019 in U.S. Appl. No. 15/600,046.
Non-Final Office Action dated Feb. 5, 2019 in U.S. Appl. No. 15/482,104.
Notice of Allowance dated Jun. 27, 2019 in U.S. Appl. No. 15/482,104.
Non-Final Office Action dated Jun. 1, 2020 in U.S. Appl. No. 16/167,295.
Final Office Action dated Apr. 13, 2021 in U.S. Appl. No. 16/167,295.
Non-Final Office Action dated Apr. 30, 2021 in U.S. Appl. No. 16/278,608.
Non-Final Office Action dated Jul. 20, 2021 in U.S. Appl. No. 16/211,896.
Notice of Allowance dated Nov. 10, 2021 in U.S. Appl. No. 16/211,896.
Non-Final Office Action dated May 11, 2022 in U.S. Appl. No. 16/411,048.
Notice of Allowance dated Oct. 20, 2022 in U.S. Appl. No. 16/411,048.
Non-Final Office Action dated Aug. 9, 2019 in U.S. Appl. No. 16/517,435.
Notice of Allowance dated Jan. 31, 2020 in U.S. Appl. No. 16/517,435.
Non-Final Office Action dated Jul. 26, 2021 in U.S. Appl. No. 16/630,824.
Final Office Action dated Jan. 11, 2022 in U.S. Appl. No. 16/630,824.
Non-Final Office Action dated Mar. 2, 2022 in U.S. Appl. No. 16/630,824.
Notice of Allowance dated Aug. 3, 2022 in U.S. Appl. No. 16/630,824.
Notice of Allowance dated Feb. 4, 2022 in U.S. Appl. No. 16/644,465.
Notice of Allowance dated Mar. 7, 2022 in U.S. Appl. No. 16/644,487.
Non-Final Office Action dated Aug. 24, 2021 in U.S. Appl. No. 16/657,935.
Non-Final Office Action dated Apr. 12, 2022 in U.S. Appl. No. 16/753,560.
Notice of Allowance dated Sep. 14, 2022 in U.S. Appl. No. 16/753,560.
Non-Final Office Action dated May 15, 2020 in U.S. Appl. No. 16/791,895.
Final Office Action dated Oct. 15, 2020 in U.S. Appl. No. 16/791,895.
Non-Final Office Action dated Jun. 8, 2021 in U.S. Appl. No. 16/791,895.
Final Office Action dated Dec. 20, 2021 in U.S. Appl. No. 16/791,895.
Non Final Office Action dated Jun. 24, 2022 in U.S. Appl. No. 16/791,895.
Notice of Allowance dated Oct. 20, 2021 in U.S. Appl. No. 16/820,587.
Non-Final Office Action dated May 6, 2022 in U.S. Appl. No. 16/855,965.
Non-Final Office Action dated Sep. 15, 2022 in U.S. Appl. No. 17/081,898.
Notice of Allowance dated Sep. 15, 2022 in U.S. Appl. No. 17/081,898.
Office Action dated Apr. 10, 2023 in U.S. Appl. No. 17/859,971.
Non-Final Office Action dated Mar. 2, 2023 in U.S. Appl. No. 17/899,416.
Non-Final Office Action dated Mar. 29, 2023 in U.S. Appl. No. 17/832,977.
International Search Report and Written Opinion dated Apr. 29, 2016 in Application No. PCT/US2015/061921.
International Search Report and Written Opinion dated Aug. 16, 2017 in Application No. PCT/US2017/033540.
International Search Report and Written Opinion dated Jun. 19, 2017 in Application No. PCT/US2017/026609.
International Search Report and Written Opinion dated Dec. 3, 2018 in Application No. PCT/US2018/049411.
International Search Report and Written Opinion dated Dec. 3, 2018. Application No. PCT/US2018/049398.
International Search Report and Written Opinion dated Jan. 15, 2019 in Application No. PCT/US2018/054715.
International Search Report and Written Opinion dated Mar. 6, 2019 in Application No. PCT/US2018/042098.
International Search Report and Written Opinion dated Mar. 29, 2019 in Application No. PCT/US2018/064308.
International Search Report and Written Opinion dated Jun. 6, 2019 in Application No. PCT/US2019/018431.
International Search Report and Written Opinion dated Jul. 29, 2019 in Application No. PCT/US2019/32066.
International Search Report and Written Opinion dated Jan. 28, 2020 in Application No. PCT/US2019/057492.
International Search Report and Written Opinion dated Mar. 19, 2020 in Application No. PCT/US2019/057081.
International Search Report and Written Opinion dated Jun. 15, 2020 in Application No. PCT/US2020/029401.
International Search Report and Written Opinion dated Apr. 6, 2021 in Application No. PCT/US2021/015106.
International Search Report and Written Opinion dated Feb. 16, 2022 in Application No. PCT/US2021/056910.
International Search Report and Written Opinion dated May 11, 2022 in Application No. PCT/US2022/012909.
European Search Report dated Jun. 7, 2019 in European Application No. 15825979.
European Search Report dated Jan. 28, 2020 in European Application No. 15825979.
Office Action dated Oct. 31, 2019 in Chinese Application No. 201780033378.3.
Office Action dated Apr. 6, 2021 in Chinese Application No. 201780033378.3.
Office Action dated Aug. 4, 2021 in Chinese Application No. 201780033378.3.
Office Action dated Nov. 1, 2021 in Chinese Application No. 201780033378.3.
Office Action dated Feb. 4, 2020 in Brazilian Patent Application No. 112017021842.9.
Office Action dated Jul. 15, 2021 in Japanese Patent Application No. 2019-503636.
Office Action dated Apr. 28, 2021 in India Patent Application No. 20181704169.
Office Action dated Jul. 29, 2021 in India Patent Application No. 202017005710.
Office Action dated Mar. 1, 2022 in India Patent Application No. 202017014752.
Office Action dated Oct. 31, 2022 in India Patent Application No. 202117022077.
Office Action dated Mar. 6, 2023 in India Patent Application No. 202017037089.
Office Action dated Oct. 10, 2022 in Chinese Patent Application No. 202110545596.3.
Office Action dated May 5, 2023 in Chinese Patent Application No. 201780044144.9.
Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82 (2013).
Anand et al., "Solar Cooling Systems for Climate Change Mitigation: A Review," Renewable and Sustainable Energy Reviews, vol. 41, pp. 143-161 (2015).
De Antonellis et al., "Simulation, Performance Analysis and Optimization of Desiccant Wheels," Energy and Buildings, vol. 42, No. 9, pp. 1386-1393 (2010).
Eriksson et al., "Diurnal Variations of Humidity and Ice Water Content in the Tropical Upper Troposphere," Atmos. Chem. Phys,. Vol. 10, p. 11519-11533 (2010).

(56) References Cited

OTHER PUBLICATIONS

European Solar Thermal Industry Federation (ESTIF), "Key Issues for Renewable Heat in Europe (K4RES-H)," Solar Assisted Cooling-WP3, Task 3.5, Contract EIE/04/204/S07.38607, pp. 1-21 (2006).
Ge et al., "A Mathematical Model for Predicting the Performance of a Compound Desiccant Wheel (A Model of a Compound Desiccant Wheel)," Applied Thermal Engineering, vol. 30, No. 8, pp. 1005-1015 (2010).
Kassem et al., "Solar Powered Dehumidification Systems Using Desert Evaporative Coolers: Review," International Journal of Engineering and Advanced Technology {IJEAT), ISSN: 2249-8958, vol. 3, Issue 1 (2013).
Kolewar et al., "Feasability of Solar Desiccant Evaporative Cooling: A Review," International Journal of Scientific & Engineering Research, ISSN: 2229-5518, vol. 5, Issue 10 (2014).
La et al., "Technical Development of Rotary Desiccant Dehumidification and Air Conditioning: A Review," Renewable and Sustainable Energy Reviews, vol. 14, pp. 130-147 (2010).
Nia et al., "Modeling and Simulation of Desiccant Wheel for Air Conditioning," Energy and Buildings, vol. 38, No. 10, pp. 1230-1239 (2006).
Kozubal et al.,"Desiccant Enhanced Evaporative Air-Conditioning {DEVap): Evaluation of a New Concept in Ultra Efficient Air Conditioning," National Renewal Energy Laboratory {NREL), Technical Report, NREL/TP-5500-49722 (2011).
Critoph et al., "Solar Energy for Cooling and Refrigeration," Engineering Department, University of Warwick, Coventry CV4 7AL, United Kingdom (1997).
Wahlgren, "Atmospheric Water Vapour Processor Designs for Potable Water Production: A Review," Wat. Res., vol. 35, No. 1, pp. 1-22 (2001).
Gad et al., "Application of a Solar Desiccant/Collector System for Water Recovery From Atmospheric Air," Renewal Energy, vol. 22, No. 4, pp. 541-556 (2001).
William et al., "Desiccant System for Water Production From Humid Air Using Solar Energy," Energy, vol. 90, pp. 1707-1720 (2015).
PV Performance Modeling Collaborative. (2014). Irradiance & Insolation. Accessed Aug. 18, 2021 at https://pvpmc.sandia.gov/modeling-steps/1-weather-design-inputs/irradiance-and-insolation-2/ (Year: 2014).
ACS. (2012). A Single-Layer Atmosphere Model. Accessed on Aug. 17, 2021 at https://www.acs.org/content/acs/en/ climatescience/atmosphericwarming/singlelayermodel.html (Year: 2012).
Materials Technology. (2010). UV Exposure Across Surface of Earth. Accessed Aug. 17, 2021 at http://www.drb-mattech.co.uk/uv%20map.html (Year: 2010).

\* cited by examiner

SYSTEMS FOR CONTROLLED TREATMENT OF WATER WITH OZONE AND RELATED METHODS THEREFOR

CROSS-REFERENCE TO RELATED APPLICATIONS

This application is a continuation of U.S. patent application Ser. No. 16/630,824 filed on Jan. 13, 2020, entitled, "SYSTEMS FOR CONTROLLED TREATMENT OF WATER WITH OZONE AND RELATED METHODS THEREFOR". The '824 application is a U.S. national stage entry under 35 U.S.C. §371 of International Application No. PCT/US2018/042098 filed Jul. 13, 2018 entitled "SYSTEMS FOR CONTROLLED TREATMENT OF WATER WITH OZONE AND RELATED METHODS THEREFOR," which claims priority to, and the benefit of, U.S. Provisional Patent Application Ser. No. 62/532,973 filed on Jul. 14, 2017, which is entitled "SYSTEMS FOR CONTROLLED TREATMENT OF WATER WITH OZONE AND RELATED METHODS THEREFOR." The contents of the above-identified applications are herein incorporated by reference in their entirety.

TECHNICAL FIELD

The present disclosure is related to ozone-based treatment techniques and, more particularly, to techniques that utilize ozone for treating and sanitizing water and/or other substances.

BACKGROUND

Millions of people across many different geographic areas lack access to safe drinking water. Various devices have been developed that provide assistance with obtaining water from underground water reserves, atmospheric humidity, and other sources. However, one major drawback of such devices is that they do not adequately sanitize and clean the water. As a result, the water obtained by these devices often includes unacceptable levels of germs, bacteria, algae, and/or other contaminants. Drinking water that has not been properly sanitized can cause extreme harm or even death to individuals.

BRIEF DESCRIPTION OF THE DRAWINGS

To facilitate further description of the embodiments, the following drawings are provided in which.

Figure 1:
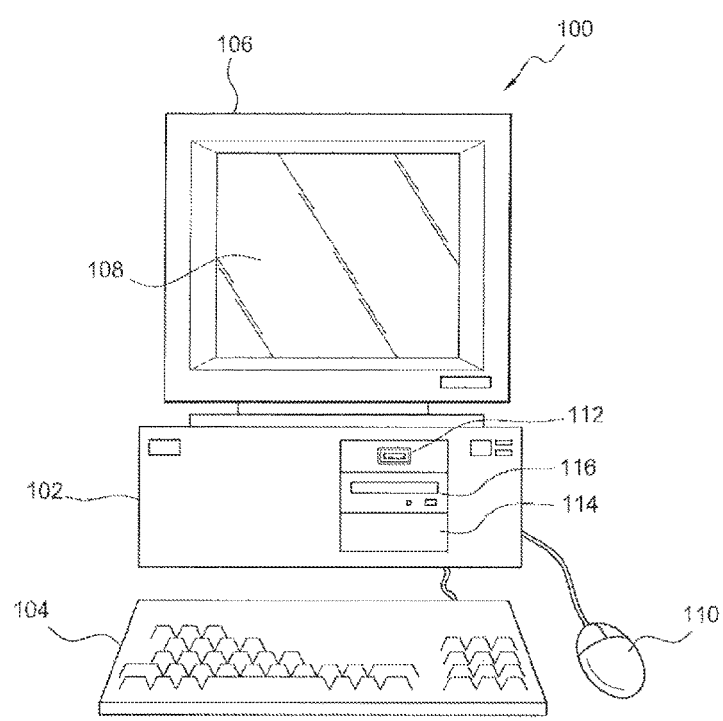
FIG. 1 illustrates a front elevational view of an exemplary computer system that is suitable to implement at least part of an ozone generator control system of the system of FIG. 3, and/or to implement at least part of one or more of the activities of the method of FIG. 10 or one or more other methods described herein.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION OF EXAMPLES OF EMBODIMENTS

In one embodiment, a system is disclosed comprising: one or more processors; and one or more non-transitory memory storage devices storing computer instructions configured to run on the one or more processors and perform: generating ozone; and applying the ozone to water; wherein: generating the ozone comprises: controlling a quantity of the ozone generated; and controlling when the ozone is generated.

In another embodiment, a method is disclosed which is implemented via execution of computer instructions configured to run at one or more processors and configured to be stored at one or more non-transitory memory storage devices, the method comprising: generating ozone; and applying the ozone to water; wherein: generating the ozone comprises: controlling a quantity of the ozone generated; and controlling when the ozone is generated.

In another embodiment, a system is disclosed comprising: a water supply system configured to make water available to a user; and an ozone generator system configured to generate ozone and apply the ozone to the water prior to use of the water by the user; wherein: the water supply system comprises a water generating unit; the ozone generator system comprises an ozone generator control system; and the ozone generator control system is configured to control a quantity of the ozone generated and when the ozone is generated.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage devices described herein. For example, in some embodiments, all or a portion of computer system 100 can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) also can be appropriate for implementing part or all of one or more embodiments of the techniques, methods, and/or systems described herein.

In many embodiments, computer system 100 can comprise chassis 102 containing one or more circuit boards (not shown), a Universal Serial Bus (USB) port 112, a hard drive 114, and an optical disc drive 116. Meanwhile, for example, optical disc drive 116 can comprise a Compact Disc Read-Only Memory (CD-ROM), a Digital Video Disc (DVD) drive, or a Blu-ray drive. Still, in other embodiments, a different or separate one of a chassis 102 (and its internal components) can be suitable for implementing part or all of one or more embodiments of the techniques, methods, and/or systems described herein.

Figure 2:
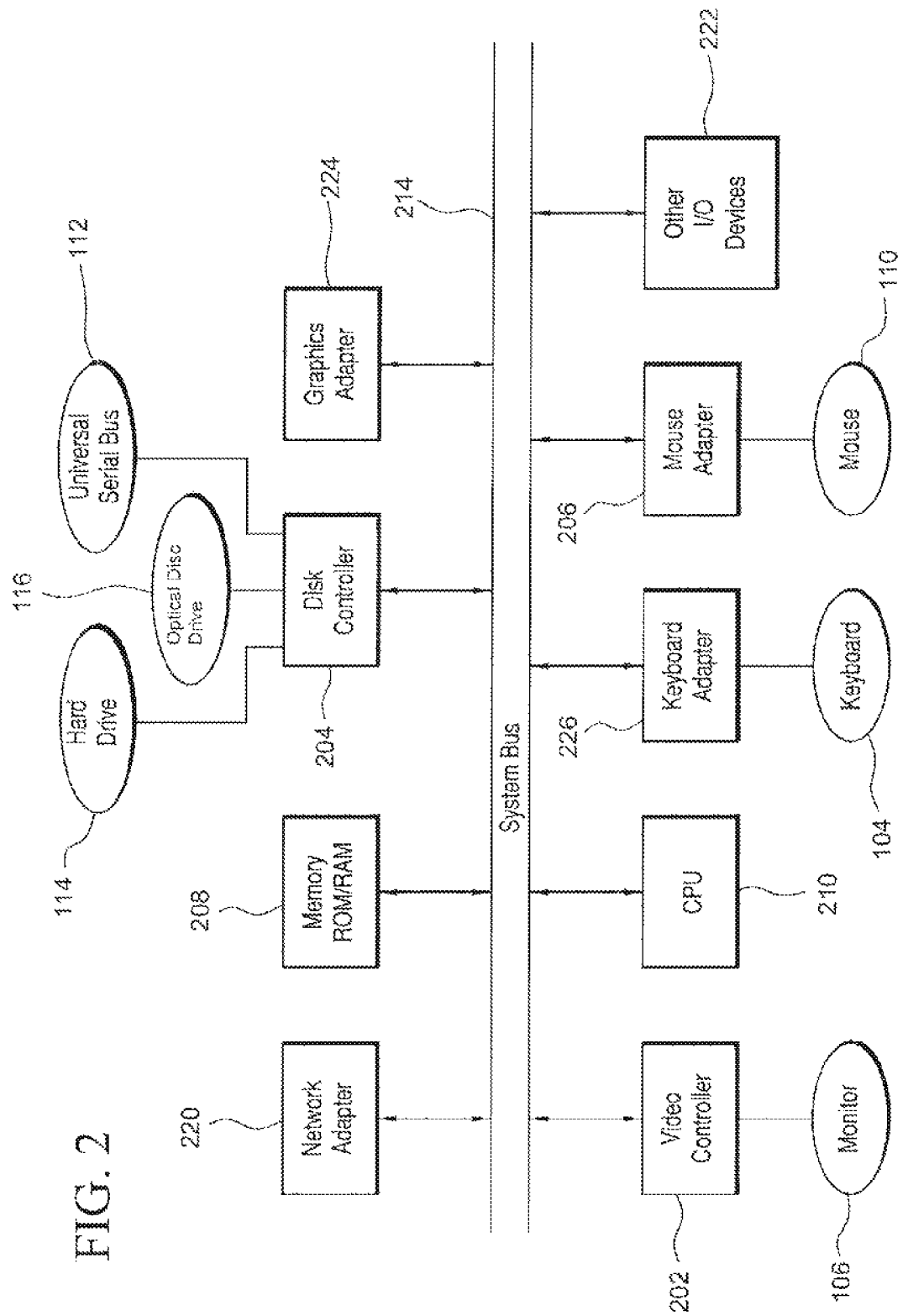
FIG. 2 illustrates a representative block diagram of exemplary elements included on the circuit boards inside a chassis of the computer system of FIG. 1.

Turning ahead in the drawings, FIG. 2 illustrates a representative block diagram of exemplary elements included on the circuit boards inside chassis 102 (FIG. 2). For example, a central processing unit (CPU) 210 is coupled to a system bus 214. In various embodiments, the architecture of CPU 210 can be compliant with any of a variety of commercially distributed architecture families.

In many embodiments, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

The memory storage device(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1 & 2), hard drive 114 (FIGS. 1 & 2), optical disc drive 116 (FIGS. 1 & 2), a floppy disk drive (not shown), etc. As used herein, non-volatile and/or non-transitory memory storage device(s) refer to the portions of the memory storage device(s) that are non-volatile and/or non-transitory memory.

In various examples, portions of the memory storage device(s) of the various embodiments disclosed herein (e.g., portions of the non-volatile memory storage device(s)) can be encoded with a boot code sequence suitable for restoring computer system 100 (FIG. 1) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 100 (FIG. 1). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) iOS™ by Apple Inc. of Cupertino, Calif., United States of America, (ii) the Blackberry® OS by Research In Motion (RIM) of Waterloo, Ontario, Canada, (iii) the Android™ OS developed by the Open Handset Alliance, or (iv) the Windows Mobile™ OS by Microsoft Corp. of Redmond, Wash., United States of America. Further, as used herein, the term "computer network" can refer to a collection of computers and devices interconnected by communications channels that facilitate communications among users and allow users to share resources (e.g., an internet connection, an Ethernet connection, etc.). The computers and devices can be interconnected according to any conventional network topology (e.g., bus, star, tree, linear, ring, mesh, etc.).

As used herein, the term "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1 & 2) and mouse 110 (FIGS. 1 & 2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1 & 2) to display images on a screen 108 (FIG. 1) of computer system 100 (FIG. 1). Disk controller 204 can control hard drive 114 (FIGS. 1 & 2), USB port 112 (FIGS. 1 & 2), and CD-ROM drive 116 (FIGS. 1 & 2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage device(s) of the various embodiments disclosed herein can be executed by CPU 210 (FIG. 2). At least a portion of the program instructions, stored on these devices, can be suitable for carrying out at least part of the techniques, methods, and activities of the methods described herein. In various embodiments, computer system 100 can be reprogrammed with one or more systems, applications, and/or databases to convert computer system 100 from a general purpose computer to a special purpose computer.

Further, although computer system 100 is illustrated as a desktop computer in FIG. 1, in many examples, system 100 can have a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise an embedded system.

Figure 3:
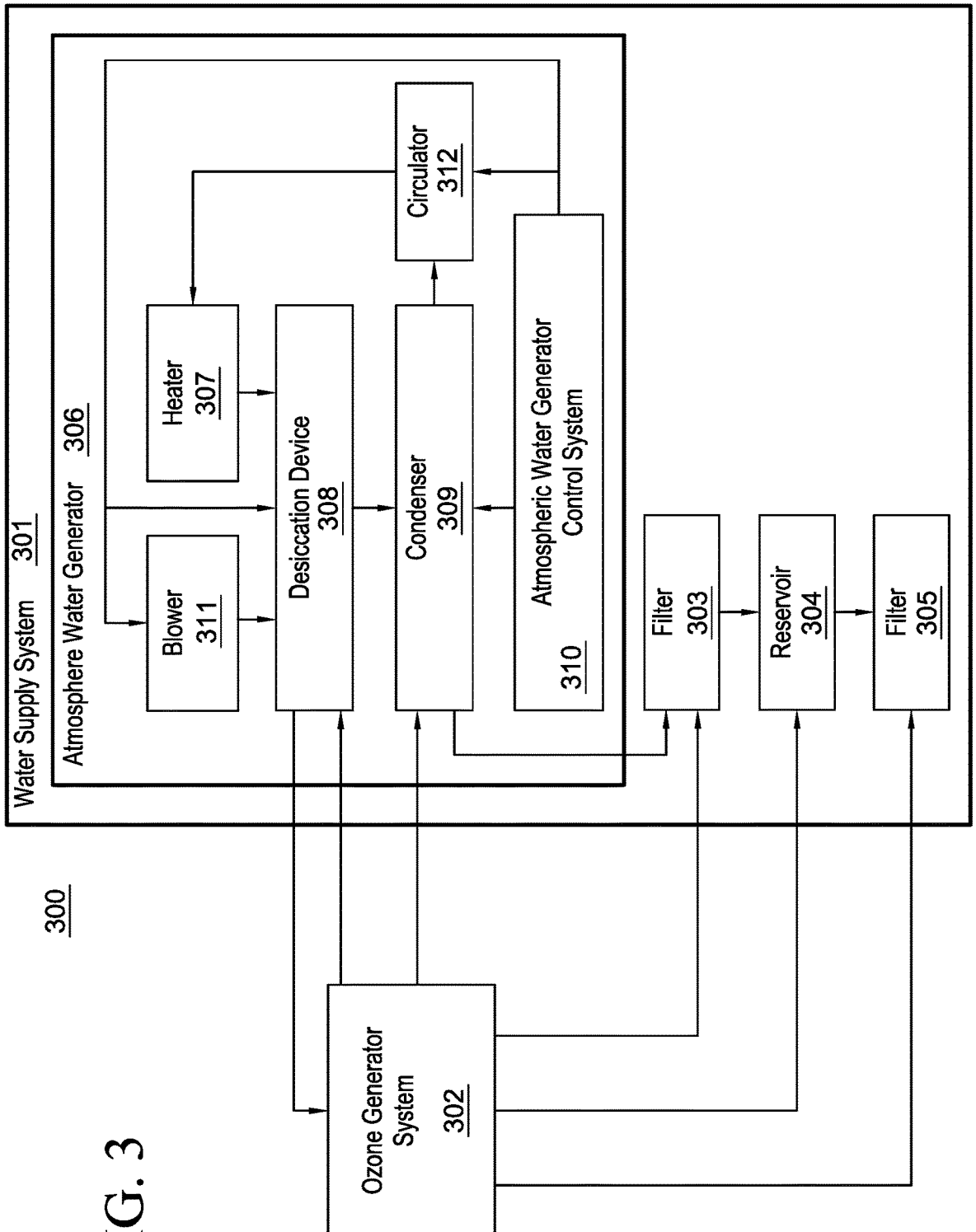
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements of system 300 can perform various methods and/or activities of those methods. In these or other embodiments, the methods and/or the activities of the methods can be performed by other suitable elements of system 300.

As explained in greater detail below, in many embodiments, system 300 can make available water to a user of system 300. For example, in some embodiments, system 300 can generate the water to make available the water to the user of system 300.

In these or other embodiments, system 300 can generate ozone and apply the ozone to one or more substances (e.g., water). In many embodiments, system 300 can control treatment of the substance(s) (e.g., water) with the ozone, such as, for example, to optimize treatment of the substance(s) (e.g., water) with the ozone. For example, in some embodiments, system 300 can control a quantity of the ozone generated, and/or when the ozone is generated.

Accordingly, in many embodiments, system 300 can sanitize water made available to a user of system 300, such as, for example, to make the water potable. In these or other embodiments, system 300 can sanitize one or more interior surfaces of a water supply system (e.g., water supply system 301 (FIG. 3)).

Generally, therefore, system 300 can be implemented with hardware and/or software, as described herein. In some embodiments, at least part of the hardware and/or software can be conventional, while in these or other embodiments, part or all of the hardware and/or software can be customized (e.g., optimized) for implementing part or all of the functionality of system 300 described herein.

System 300 comprises an ozone generator system 302. In many embodiments, system 300 also can comprise a water supply system 301. In these embodiments, ozone generator system 302 can be coupled to water supply system 301. In some embodiments, water supply system 301 can be omitted.

Water supply system 301 can make available water to a user of system 300. Accordingly, water supply system 301 can comprise any suitable system configured to make available water to the user of system 300. For example, in some embodiments, water supply system 301 can comprise a public water supply or a water collector (e.g., a rain collector, a fog net, etc.). In many embodiments, water supply system 301 can comprise a filter 303, a reservoir 304, and/or a filter 305. In other embodiments, filter 303, reservoir 304, and/or filter 305 can be omitted.

In many embodiments, water supply system 301 can generate the water made available to the user of system 300. In some of these embodiments, water supply system 301 can be devoid of a public water supply and/or a water collector (e.g., a rain collector, a fog net, etc.). For example, in some embodiments, water supply system 301 can comprise a water generating unit 306. In some embodiments, filter 303, reservoir 304, and/or filter 305 can be part of water generating unit 306.

In many embodiments, water generating unit 306 can comprise any suitable system configured to generate water. For example, water generating unit 306 can comprise an atmospheric water generator and/or a drinking water solar panel. In some embodiments, a drinking water solar panel also can be referred to as a water-from-air solar panel. In some embodiments, the generating unit 306 can store firmware that is executed by a microcontroller (e.g., which can be integrated into, or in communication with, the generating unit 306) to perform some or all of the functions associated with the water generating unit 306 described herein. In certain embodiments, the generating unit 306 may lack a hard-drive.

In many embodiments, water generating unit 306 can comprise a heater 307, a desiccation device 308, and a condenser 309. Heater 307 can be coupled to desiccation device 308, desiccation device 308 can be coupled to condenser 309, and condenser 309 can be coupled to heater 307. In some embodiments, water generating unit 306 can comprise a water generating unit control system 310, a blower 311, and a circulator 312.

In many embodiments, water generating unit 306 can operably move and repeatedly cycle one or more regeneration fluids from heater 307 to desiccation device 308 to condenser 309 and back to heater 307 (e.g., in a closed loop), such as, for example, by using circulator 312, as explained below. Heater 307, desiccation device 308, and condenser 309 can be coupled together by any suitable conduits configured to transfer the regeneration fluid(s) among heater 307, desiccation device 308, and condenser 309. Exemplary regeneration fluid(s) can comprise humid air, one or more supersaturated or high relative humidity gases (e.g., a relatively humidity greater than approximately 90%), one or more glycols, one or more ionic liquids, etc.

Desiccation device 308 can comprise an adsorption zone configured to receive a process fluid (e.g., humid air), a desorption zone configured to receive the regeneration fluid(s), and a desiccant element configured to be operably moved and repeatedly cycled between the adsorption zone and the desorption zone to capture (e.g., absorb and/or adsorb) water from the process fluid in the absorption zone and desorb water into the regeneration fluid(s) in the desorption zone. After the processing fluid is received at the adsorption zone of desiccation device 308, the processing fluid can be selectively exhausted to the atmosphere around water generating unit 306 and/or transferred to ozone generator system 302 to aid in generating ozone, as explained in greater detail below.

In some embodiments, the desiccant element can comprise any suitable material or materials configured such that the desiccant element can capture (e.g., absorb and/or adsorb) water. For example, the material(s) of the desiccant element can comprise one or more hygroscopic materials. In many embodiments, exemplary material(s) for the desiccant element can comprise silica, silica gel, alumina, alumina gel, montmorillonite clay, one or more zeolites, one or more molecular sieves, activated carbon, one or more metal oxides, one or more lithium salts, one or more calcium salts, one or more potassium salts, one or more sodium salts, one or more magnesium 25 salts, one or more phosphoric salts, one or more organic salts, one or more metal salts, glycerin, one or more glycols, one or more hydrophilic polymers, one or more polyols, one or more polypropylene fibers, one or more cellulosic fibers, one or more derivatives thereof, and one or more combinations thereof.

In some embodiments, the desiccant element can comprise any suitable form or forms configured such that the desiccant element can capture (e.g., absorb and/or adsorb) and desorb water. For example, the desiccant element can comprise a liquid form and/or a solid form. In further embodiments, the desiccant element can comprise a porous solid impregnated with one or more hygroscopic material(s).

In some embodiments, the desiccant element can be configured to capture (e.g., absorb and/or adsorb) water at one or more temperatures and/or pressures and can be configured to desorb water at one or more other temperatures and/or pressures. In some embodiments, the desiccant can be implemented with material(s) and/or form(s), and/or can be otherwise configured such that the desiccant element does not capture (e.g., absorb and/or adsorb) one or more materials toxic to humans, pets, and/or other animals.

In many embodiments, heater 307 can provide thermal energy to the regeneration fluid(s) so that the regeneration fluid(s) are heated upon arriving at desiccation device 308. Exposing the desiccant element of desiccation device 308 to the heated regeneration fluid(s) at the desorption zone of desiccation device 308 can regenerate the desiccant element of desiccation device 308. In some embodiments, heater 307 can be any suitable device configured to provide thermal energy to the regeneration fluid(s). For example, in many embodiments, heater 307 can comprise a solar thermal heater. In these embodiments, the solar thermal heater can convert solar insolation to the thermal energy provided to the regeneration fluid(s). Further, in these embodiments, heater 307 can be part of a solar panel, which can generate electricity to electrically power water generating unit 306, water generating unit control system 310, blower 311, circulator 312, ozone generator system 302, ozone generator 401 (FIG. 4), ozone generator control system 402 (FIG. 4), and/or blower 405 (FIG. 5).

In many embodiments, condenser 309 can extract the water to be made available to the user of system 300 from the regeneration fluid(s) received at condenser 309 from desiccation device 308. For example, condenser 309 can condense water vapor from the regeneration fluid(s) into liquid water to be the water made available to the user of system 300. Accordingly, in many embodiments, condenser 309 can be configured to cool the regeneration(s) fluids by extracting thermal energy from the regeneration fluid(s). In some embodiments, condenser 309 can transfer thermal energy extracted from the regeneration fluid(s) to the process fluid upstream of desiccation device 308 and/or to the atmosphere around water generating unit 306.

In some embodiments, blower 311 can comprise any suitable device configured to move the process fluid to desiccation device 308, and when applicable, to ozone generator system 302, as further explained below. For example, in some embodiments, blower 311 can comprise a pump.

In some embodiments, circulator 312 can comprise any suitable device configured to move the regeneration fluid(s) from heater 307 to desiccation device 308 to condenser 309, and back to heater 307. For example, in some embodiments, circulator 312 can comprise a pump.

In some embodiments, water generating unit control system 310 can comprise any suitable device configured to control operation of water generating unit 306. For example, in many embodiments, water generating unit control system 310 can control operation of blower 311, circulator 312 and/or desiccation device 308. Further, in some embodiments, water generating unit control system 310 can control operation of condenser 309, such as, for example, when condenser 309 is implemented as an active device. Accordingly, water generating unit control system 310 can be electrically coupled to blower 311, circulator 312, condenser 309, and/or desiccation device 308. In many embodiments, water generating unit control system 310 can be similar or identical to computer system 100 (FIG. 1).

In many embodiments, reservoir 304 can store water to be made available to the user of system 300 by water supply system 301. Accordingly, reservoir 304 can comprise any suitable receptacle or container configured to store water.

In some embodiments, reservoir 304 can receive the water stored by reservoir 304 to be made available to the user of system 300 from any suitable water source, such as, for example, a public water supply. In these or other embodiments, when water supply system 301 generates water made available to the user of system 300, such as, for example, by water generating unit 306, reservoir 304 can receive and store the water generated by water supply system 301. For example, in some embodiments, reservoir 304 can receive the water extracted from the regeneration fluid(s) of water generating unit 306 by condenser 309. Further, in some embodiments, reservoir 304 can be coupled to a public water supply and/or water generating unit 306, such as, for example, at condenser 309. Accordingly, water supply system 301 can comprise any suitable conduit or conduits configured to transfer water from a public water supply and/or water generating unit 306 to reservoir 304.

In many embodiments, filter 303 can be operable to filter water received by reservoir 304, such as, for example, to remove one or more materials (e.g., one or more materials toxic to humans) from the water. Accordingly, filter 303 can be coupled to reservoir 304, such as, for example, between reservoir 304 and a public water supply of water supply system 301 and/or water generating unit 306. Filter 303 can comprise any suitable device configured to filter water. For example, filter 303 can comprise a carbon filter or a stainless steel frit. In some embodiments, filter 303 can be omitted, including, for example, in embodiments in which reservoir 304 is omitted.

In many embodiments, filter 305 can be operable to filter the water made available to the user of system 300, such as, for example, to remove one or more materials (e.g., one or more materials toxic to humans) from the water. For example, in some embodiments, filter 305 can filter the water made available to the user of system 300 immediately before the water is provided to the user of system 300, such as, for example, at an output of water supply system 301. In further embodiments, when water supply system 301 comprises reservoir 304, filter 305 can be coupled to reservoir 304, such as, for example, at an output of reservoir 304.

Filter 305 can comprise any suitable device configured to filter water. For example, filter 305 can comprise a carbon filter or a stainless steel frit. In some embodiments, filter 305 can be omitted.

In many embodiments, filter 305 can remove residual ozone from the water made available to the user of system 300 when ozone is applied to the water, as explained below. For example, when filter 305 comprises a carbon filter, the carbon filter can capture residual ozone in water passing through filter 305, and the residual ozone can react with other organic matter captured in the carbon filter, and/or the residual ozone can react with the carbon filter itself, any mechanism of which can function to remove residual ozone from the water.

Ozone generator system 302 can generate ozone. In many embodiments, ozone generator system 302 can generate ozone in a controlled manner, such as, for example, when ozone generator system 302 comprises ozone generator control system 402 (FIG. 4), as explained below. Further, ozone generator system 302 can apply the ozone generated by ozone generator system 302 to one or more substances, such as, for example, to sterilize the substance(s). In many embodiments, when system 300 comprises water supply system 301, ozone generator system 302 can apply the ozone generated by ozone generator system 302 to the water made available to the user of system 300 by water supply system 301 before the user of system 300 uses (e.g., drinks) the water. Further, in these or other embodiments, when system 300 comprises water generating unit 306, ozone generator system 302 can apply the ozone generated by ozone generator system 302 to one or more interior surfaces of water generating unit 306, heater 307, desiccation device 308, and/or condenser 309, such as, for example, to sterilize the interior surface(s).

In many embodiments, ozone generator system 302 can be coupled to water supply system 301, such as, for example, to apply ozone to the water made available to the user of system 300 by water supply system 301 and/or the interior surface(s) of water generating unit 306, heater 307, desiccation device 308, and/or condenser 309. Further, in some embodiments, ozone generator system 302 can be coupled to water generating unit 306 (e.g., desiccation device 308) to receive the process fluid output from desiccation device 308. In these or other embodiments, system 300 can comprise any suitable conduit or conduits configured to transfer the ozone generated by ozone generator system 302 to water supply system 301 and/or the process fluid output from desiccation device 308 to ozone generator system 302. In some embodiments, ozone generator system 302 can be part of water supply system 301 and/or water generating unit 306.

In some embodiments, ozone generator system 302 can apply ozone to (i) the water made available to the user of system 300 by water supply system 301 and/or (ii) the interior surface(s) of water generating unit 306, heater 307, desiccation device 308, and/or condenser 309 at the same time and/or at different times. Accordingly, in these or other embodiments, ozone generator system 302 can be coupled to water supply system 301 at multiple locations. For example, in some embodiments, ozone generator system 302 can be coupled to water generating unit 306, such as, for example, at condenser 309. In these or other embodiments, ozone generator system 302 can be coupled to reservoir 304.

Figure 4:
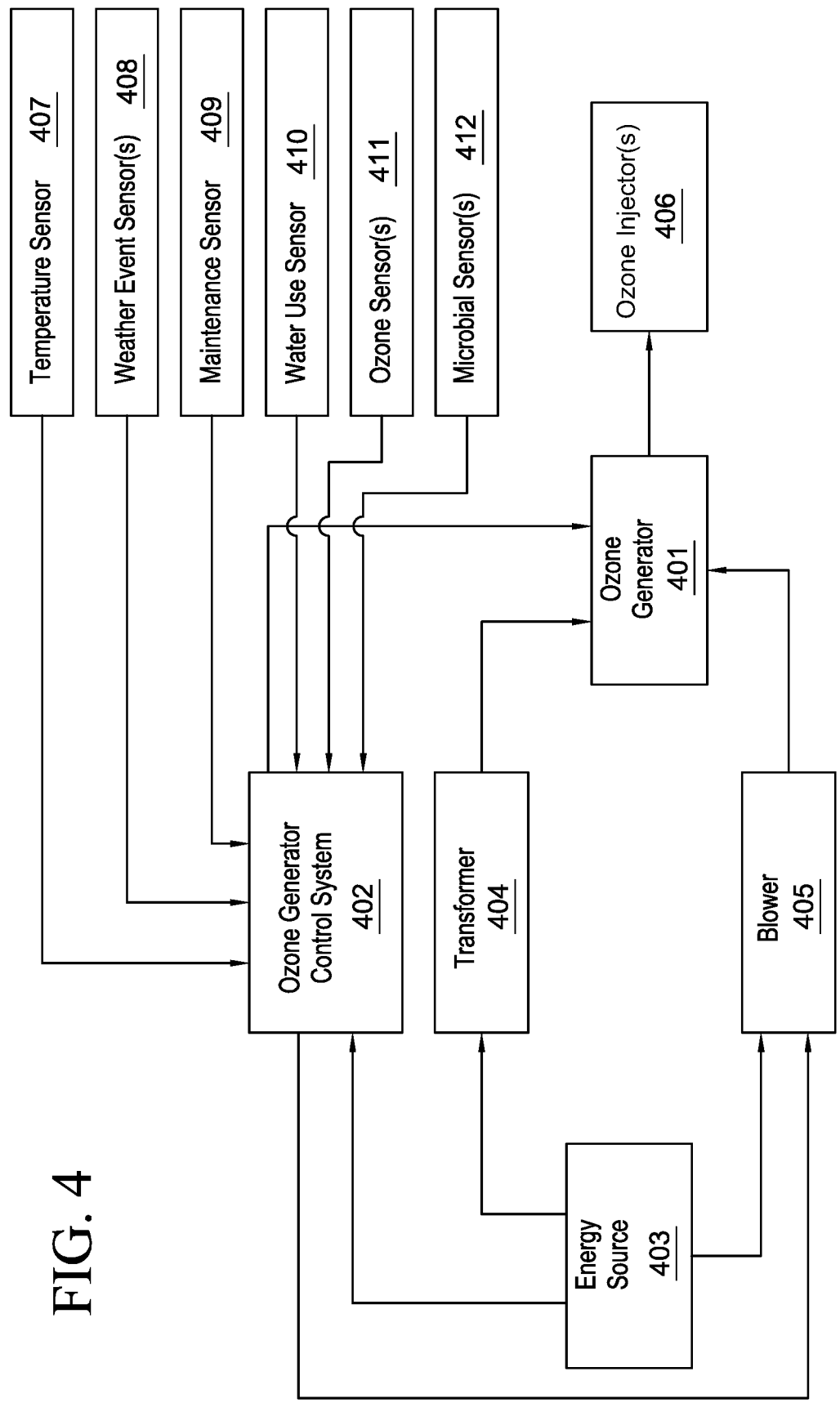
FIG. 4 illustrates a representative block diagram of an ozone generator of the system of FIG. 3, according to the embodiment of FIG. 3.
Figure 5:
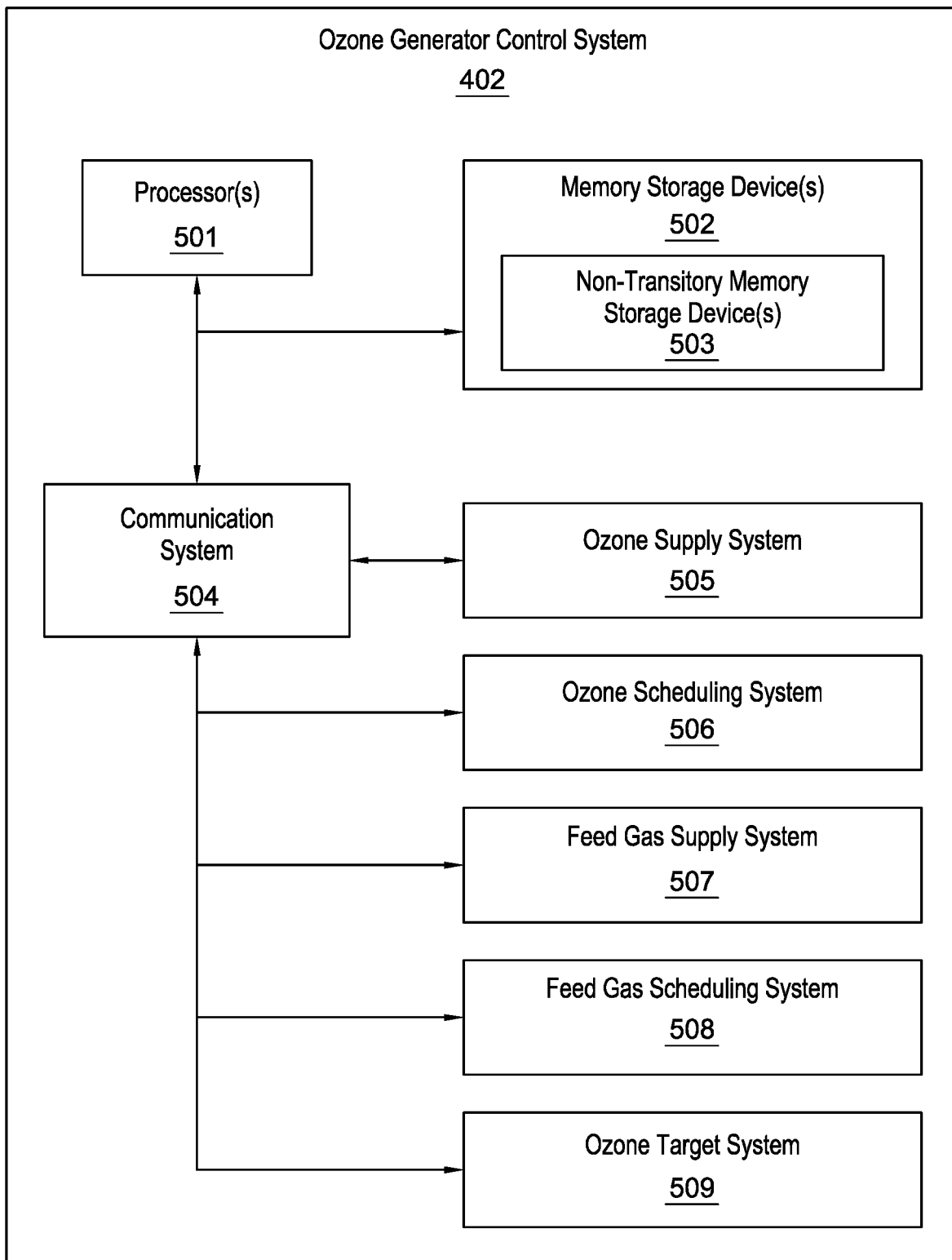
FIG. 5 illustrates a representative block diagram of an ozone generator control system of the ozone generator of FIG. 4, according to the embodiment of FIG. 3.

Turning ahead in the drawings, FIG. 4 illustrates a representative block diagram of ozone generator system 302, according to the embodiment of FIG. 3.

In many embodiments, ozone generator system 302 comprises an ozone generator 401 and an ozone generator control system 402. Further, ozone generator system 302 can comprise an energy source 403, a transformer 404, a blower 405, one or more ozone injectors 406, a temperature sensor 407, one or more weather event sensors 408, one or more ozone sensors 411, and/or one or more microbial sensors 412. Also, ozone generator system 302 can comprise a maintenance sensor 409 and/or a water use sensor 410, such as, for example, when system 300 (FIG. 3) comprises water supply system 301 of FIG. 3 (e.g., water generating unit 306 (FIG. 3)). In some embodiments, transformer 404, blower 405, ozone injector(s) 406, temperature sensor 407, weather event sensor(s) 408, maintenance sensor 409, water use sensor 410, ozone sensor(s) 411, and/or microbial sensor(s) 412 can be omitted.

In many embodiments, ozone generator 401 can generate ozone from a feed gas including oxygen (e.g., air). Accordingly, ozone generator 401 can comprise any suitable device configured to generate ozone. In some embodiments, ozone generator 401 can comprise an ultraviolet ozone generator. In other embodiments, ozone generator 401 can comprise a corona ozone generator. For example, in these embodiments, in order to generate ozone, ozone generator 401 can generate an electric field and pass the feed gas through the electric field, thereby causing some diatomic oxygen molecules to dissociate into oxygen atoms that attach to other diatomic oxygen molecules to form ozone.

In many embodiments, when system 300 (FIG. 3) comprises water supply system 301 (FIG. 3), when water supply system 301 (FIG. 3) comprises water generating unit 306 (FIG. 3), and when the process fluid used by water generating unit 306 (FIG. 3) includes oxygen, ozone generator 405 can use the process fluid as the feed gas from which ozone generator 405 generates ozone. Using the process fluid as the feed gas can be advantageous because the process fluid can be dehumidified by operation of desiccation device 308, and dehumidifying the feed gas can be helpful to mitigate or eliminate the formation of nitric acid by ozone generator 405, which could corrode ozone generator system 302 (FIG. 3), and when applicable, water supply system 301 (FIG. 3).

In many embodiments, blower 405 can deliver the feed gas to ozone generator 401. Further, blower 405 can push the resulting ozone and remaining feed gas onward to water supply system 301 (FIG. 3). Accordingly, in some embodiments, blower 405 can comprise any suitable device configured to move the feed gas to ozone generator 401, and when applicable, ozone and residual feed gas to water supply system 301 (FIG. 3). For example, in some embodiments, blower 405 can comprise a pump. Further, blower 405 can be coupled to ozone generator 401, and ozone generator system 302 can comprise any suitable conduit or conduits configured to transfer the feed gas from blower 405 to ozone generator 401.

In some embodiments, when the feed gas comprises the process fluid used by water generating unit 306 (FIG. 3), blower 405 can receive the process fluid from water generating unit 306 (FIG. 3). In some embodiments, when the feed gas comprises the process fluid used by water generating unit 306 (FIG. 3), blower 405 can be omitted. In these embodiments, blower 311 (FIG. 3) can operate to provide the functionality of blower 405. In the same or other embodiments, blower 405 can be combined with blower 311 (FIG. 3).

In many embodiments, energy source 403 can electrically power ozone generator 401. In some embodiments, energy source 403 can electrically power ozone generator control system 402. Further, in some embodiments, when ozone generator system 302 comprises blower 405, energy source 403 can electrically power blower 405. In many embodiments, energy source 403 can be electrically coupled to ozone generator 401, ozone generator control system 402, blower 405, and/or transformer 404.

For example, energy source 403 can be configured to deliver 12 volt electricity to blower 405 and/or transformer 404. Meanwhile, transformer 404 can be configured to transform the electricity provided by energy source 403 to ozone generator 401. For example, transformer 404 can be configured to transform the electricity provided by energy source 403 to ozone generator 401 from 12 volt electricity to 3 kilovolt electricity.

In many embodiments, energy source 403 can comprise any suitable energy source that can electrically power ozone generator 401, ozone generator control system 402, and/or blower 405. In these or other embodiments, when system 300 (FIG. 3) comprises water supply system 301 (FIG. 3), when water supply system 301 (FIG. 3) comprises water generating unit 306 (FIG. 3), and when heater 307 (FIG. 3) is part of a solar panel, as described above, energy source 403 can comprise the solar panel. In some embodiments, energy source 403 can be used to electrically power water supply system 301 (FIG. 3), including water generating unit 306 (FIG. 3) and its heater 307 (FIG. 3), condenser 309 (FIG. 3), blower 311 (FIG. 3), circulator 312 (FIG. 3), and/or water generating unit control system 310 (FIG. 3).

In many embodiments, ozone injector(s) 406 can be operable to mix ozone generated by ozone generator 401 with one or more liquid substances (e.g., the water made available to the user of system 300 (FIG. 3) by water supply system 301 (FIG. 3) to which the ozone is applied, such as, for example, to sterilize the substance(s). Accordingly, ozone injector(s) 406 can comprise any suitable device(s) configured to mix ozone with one or more liquids. In certain embodiments, the ozone injector(s) 406 can include one or more spargers, one or more venturis, one or more aspirators and/or other devices that are capable of mixing ozone with one or more liquids. In some embodiments, ozone injector(s) 406 can be omitted, such as, for example, when none of the substance(s) to which the ozone is applied are a liquid. Although ozone generator 302 (FIG. 3) is illustrated separately from water supply system 301 (FIG. 3) at FIG. 3, in many embodiments, when system 300 (FIG. 3) comprises water supply system 301 (FIG. 3), one or more of ozone injector(s) 406 can be located at water supply system 301 (FIG. 3). For example, one or more of ozone injector(s) 406 can be located at condenser 309 (FIG. 3), and/or one or more of ozone injector(s) 406 can be located at reservoir 304 (FIG. 3).

In many embodiments, temperature sensor 407 can measure an ambient temperature proximal to (e.g., within 2 meters of, within 10 meters of, within 50 meters of) or at a location where the ozone generated by ozone generator 401 is to be applied (e.g., in real time). For example, when system 300 (FIG. 3) comprises water supply system 301 (FIG. 3), temperature sensor 407 can measure an ambient temperature proximal to (e.g., within 2 meters of, within 10 meters of, within 50 meters of) or at a location of water supply system 301 (FIG. 3) (e.g., in real time). Further, when system 300 (FIG. 3) comprises water supply system 301 (FIG. 3), and water supply system 301 (FIG. 3) comprises water generating unit 310 (FIG. 3), temperature sensor 407 can measure an ambient temperature proximal to (e.g., within 2 meters of, within 10 meters of, within 50 meters of)

or at a location of water generating unit 310 (FIG. 3) (e.g., in real time). In some embodiments, temperature sensor 407 can comprise any suitable device configured to measure an ambient temperature proximal to (e.g., within 2 meters of, within 10 meters of, within 50 meters of) or at a location where the ozone generated by ozone generator 401 is to be applied. For example, temperature sensor 407 can comprise a thermometer. In some embodiments, temperature sensor 407 can be electrically coupled to ozone generator control system 402 to provide measurements of the ambient temperature to ozone generator control system 402.

In many embodiments, weather event sensor(s) 408 can detect one or more weather events proximal to (e.g., within 2 meters of, within 10 meters of, within 50 meters of) or at a location where the ozone generated by ozone generator 401 is to be applied (e.g., in real time). For example, when system 300 (FIG. 3) comprises water supply system 301 (FIG. 3), weather event sensor(s) 408 can detect weather event(s) proximal to (e.g., within 2 meters of, within 10 meters of, within 50 meters of) or at a location of water supply system 301 (FIG. 3) (e.g., in real time). Further, when system 300 (FIG. 3) comprises water supply system 301 (FIG. 3), and water supply system 301 (FIG. 3) comprises water generating unit 310 (FIG. 3), weather event sensor(s) 408 can detect weather event(s) proximal to (e.g., within 2 meters of, within 10 meters of, within 50 meters of) or at a location of water generating unit 310 (FIG. 3) (e.g., in real time).

In some embodiments, weather event sensor(s) 408 can comprise any suitable device or devices configured to detect one or more weather events proximal to (e.g., within 2 meters of, within 10 meters of, within 50 meters of) or at a location where the ozone generated by ozone generator 401 is to be applied. Exemplary weather event(s) can include a storm (e.g., a rain storm, a wind storm, a snow storm, an ice storm, a dust storm, etc.) and a toxic air quality condition, etc. In many embodiments, a storm can refer to any event that can cause fluids and/or particles to be deposited on and/or in the substance(s) to which the ozone generated by ozone generator 401 is to be applied. In these or other embodiments, weather event sensor(s) 408 can comprise (i) a barometer, such as, for example, to detect changes in atmospheric pressure associated with a rain storm, (ii) a particle sensor, such as, for example, to detect a sandstorm or a toxic particle pollution condition, and/or (iii) one or more gas sensors, such as, for example to detect a toxic gas pollution condition. In some embodiments, weather event sensor(s) 408 can be electrically coupled to ozone generator control system 402 to provide notifications of weather events to ozone generator control system 402. In other embodiments, temperature sensor 407 and/or weather event sensor(s) 408 can be omitted and replaced with information from a third-party weather service, such as, for example, The Weather Company, LLC of Atlanta, Ga., United States of America (www.weather.com).

In many embodiments, maintenance sensor 409 can detect when maintenance has been performed and completed on water supply system 301 of FIG. 3 (e.g., water generating unit 310 (FIG. 3)). Accordingly, in many embodiments, ozone generator system 302 (FIG. 3) can comprise maintenance sensor 409 when system 300 (FIG. 3) comprises maintenance sensor 409. In some embodiments, maintenance sensor 409 can comprise any suitable device configured to detect when maintenance has been performed and completed on water supply system 301 of FIG. 3 (e.g., water generating unit 310 (FIG. 3)). In some embodiments, maintenance sensor 409 can automatically detect when maintenance has been performed and completed on water supply system 301 of FIG. 3 (e.g., water generating unit 310 (FIG. 3)). In these or other embodiments, maintenance sensor 409 can receive an input from a mechanic that the maintenance has been performed and completed on water supply system 301 of FIG. 3 (e.g., water generating unit 310 (FIG. 3)) in order to detect that maintenance has been performed and completed on water supply system 301 of FIG. 3 (e.g., water generating unit 310 (FIG. 3)). In some embodiments, maintenance sensor 409 can be electrically coupled to ozone generator control system 402 to provide notifications of completed maintenance events to ozone generator control system 402.

In many embodiments, water use sensor 410 can detect when water made available to the user of system 300 (FIG. 3) by water supply system 301 (FIG. 3) has been used. Accordingly, in many embodiments, ozone generator system 302 (FIG. 3) can comprise water use sensor 410 when system 300 (FIG. 3) comprises water use sensor 410. In some embodiments, water use sensor 410 can comprise any suitable device configured to detect when water made available to the user of system 300 (FIG. 3) by water supply system 301 (FIG. 3) has been used. In some embodiments, water use sensor 410 can automatically detect when water made available to the user of system 300 (FIG. 3) by water supply system 301 (FIG. 3) has been used. In these or other embodiments, water use sensor 410 can receive an input from the user of system 300 (FIG. 3) that the water made available to the user of system 300 (FIG. 3) by water supply system 301 (FIG. 3) has been used in order to detect that water made available to the user of system 300 (FIG. 3) by water supply system 301 (FIG. 3) has been used. In some embodiments, water use sensor 410 can be electrically coupled to ozone generator control system 402 to provide notifications of water use events to ozone generator control system 402.

In some embodiments, ozone sensor(s) 411 can detect and/or measure a concentration of ozone proximal to (e.g., within 2 meters of, within 10 meters of, within 50 meters of) or at a location where the ozone generated by ozone generator 401 is to be applied. In some embodiments, ozone sensor(s) 411 can comprise any suitable device configured to detect and/or measure a concentration of ozone proximal to (e.g., within 2 meters of, within 10 meters of, within 50 meters of) or at a location where the ozone generated by ozone generator 401 is to be applied. For example, in some embodiments, ozone sensor(s) 411 can comprise an airborne ozone detector and/or an oxidation reduction potential electrode. In some embodiments, ozone sensor(s) 411 can be electrically coupled to ozone generator control system 402 to provide notifications of detected ozone and/or measurements of ozone concentration to ozone generator control system 402.

In some embodiments, microbial sensor(s) 412 can detect and/or measure a concentration of micro-organisms proximal to (e.g., within 2 meters of, within 10 meters of, within 50 meters of) or at a location where the ozone generated by ozone generator 401 is to be applied. In some embodiments, ozone sensor(s) 411 can comprise any suitable device configured to detect and/or measure a concentration of micro-organisms proximal to (e.g., within 2 meters of, within 10 meters of, within 50 meters of) or at a location where the ozone generated by ozone generator 401 is to be applied. For example, in some embodiments, microbial sensor(s) 412 can comprise an impedance sensor. In some embodiments, microbial sensor(s) 412 can be electrically coupled to ozone generator control system 402 to provide notifications of detected micro-organisms and/or measurements of micro-organism concentration to ozone generator control system 402.

In many embodiments, ozone generator control system 402 can control ozone generator 401 and/or blower 405. By controlling ozone generator 401 and/or blower 405, ozone generator control system 402 can optimize treatment (e.g., sanitation) of the substance(s) to which the ozone generated by ozone generator 401 (FIG. 4) is applied.

In some embodiments, ozone generator control system 402 can control how much ozone (e.g. a quantity of ozone) that ozone generator 401 generates and/or when ozone generator 401 generates ozone. In these or other embodiments, ozone generator control system 402 can control when blower 405 provides feed gas to ozone generator 401 and/or a feed rate with which blower 405 provides feed gas to ozone generator 401. Accordingly, in many embodiments, ozone generator control system 402 can be electrically coupled to ozone generator 401 and/or blower 405.

In some embodiments, ozone generator control system 402 can control where the ozone generated by ozone generator 401 is applied. In these embodiments, ozone generator control system 402 can be electrically coupled to one or more valves configured to selectively permit or impede transfer of ozone from ozone generator system 302 (FIG. 3) to one or more locations. Ozone generator control system 402 can control the opening and closing of the valve(s) to control where the ozone generated by ozone generator 401 is applied.

Further, ozone generator control system 402 can be similar or identical to computer system 100 (FIG. 1). In some embodiments, when system 300 (FIG. 3) comprises water supply system 301 (FIG. 3), and when water supply system 301 comprises water generating unit 306 (FIG. 3), ozone generator control system 402 can comprise water generating unit control system 310 (FIG. 3), and vice versa. In other embodiments, ozone generator control system 402 can be separate from water generating unit control system 310 (FIG. 3).

Turning ahead now in the drawings, FIG. 5 illustrates a representative block diagram of ozone generator control system 402, according to the embodiment of FIG. 3.

In many embodiments, ozone generator control system 402 can comprise one or more processors 501 and one or more memory storage devices 502. Further, memory storage device(s) 502 can comprise one or more non-transitory memory storage devices 503.

Meanwhile, in these or other embodiments, ozone generator control system 402 comprises a communication system 504, an ozone supply system 505, and an ozone scheduling system 506. In some embodiments, ozone generator control system 402 can comprise a feed gas supply system 507, a feed gas scheduling system 508, and/or an ozone target system 509. In other embodiments, feed gas supply system 507, feed gas scheduling system 508, and/or ozone target system 509 can be omitted.

In these or other embodiments, part or all of at least one or more of communication system 504, ozone supply system 505, ozone scheduling system 506, feed gas supply system 507, feed gas scheduling system 508, and ozone target system 509 can be part of at least one or more others of communication system 504, ozone supply system 505, ozone scheduling system 506, feed gas supply system 507, feed gas scheduling system 508, and ozone target system 509, and vice versa.

In many embodiments, processor(s) 501 can be similar or identical to the processor(s) described above with respect to computer system 100 (FIG. 1); memory storage device(s) 502 can be similar or identical to the memory storage device(s) described above with respect to computer system 100 (FIG. 1); and/or non-transitory memory storage device(s) 503 can be similar or identical to the non-transitory memory storage device(s) described above with respect to computer system 100 (FIG. 1). Further, communication system 504, ozone supply system 505, ozone scheduling system 506, feed gas supply system 507, and feed gas scheduling system 508 can be implemented with hardware and/or software, as desirable. Although communication system 504, ozone supply system 505, ozone scheduling system 506, feed gas supply system 507, feed gas scheduling system 508, and ozone target system 509 are shown at FIG. 5 as being separate from processor(s) 501, memory storage device(s) 502, and/or non-transitory memory storage device(s) 503, in many embodiments, part or all of communication system 504, ozone supply system 505, ozone scheduling system 506, feed gas supply system 507, feed gas scheduling system 508, and ozone target system 509 can be stored at memory storage device(s) 502 and/or non-transitory memory storage device(s) 503 and can be called and run at processor(s) 501, such as, for example, when part or all of communication system 504, ozone supply system 505, ozone scheduling system 506, feed gas supply system 507, feed gas scheduling system 508, and ozone target system 509 are implemented as software.

In many embodiments, communication system 504 can provide and manage communication between the various elements of ozone generator control system 402 (e.g., processor(s) 501, memory storage device(s) 502, non-transitory memory storage device(s) 503, ozone supply system 505, ozone scheduling system 506, feed gas supply system 507, feed gas scheduling system 508, ozone target system 509, etc.) and manage incoming and outgoing communications between ozone generator control system 402, ozone generator 401 (FIG. 4), and blower 405 (FIG. 4). Communication system 504 can be implemented using any suitable manner of wired and/or wireless communication, and/or using any one or any combination of wired and/or wireless communication network topologies and/or protocols. In many embodiments, communication system 504 can be part of hardware and/or software implemented for communications between ozone generator control system 402, ozone generator 401 (FIG. 4), and blower 405 (FIG. 4). For example, as applicable, communication system 504 can permit processor(s) 501 to call (i) software (e.g., at least part of ozone supply system 505, ozone scheduling system 506, feed gas supply system 507, feed gas scheduling system 508, ozone target system 509, etc.) stored at memory storage device(s) 502 and/or non-transitory memory storage device(s) 503, and/or (ii) data stored at memory storage device(s) 502 and/or at non-transitory memory storage device(s) 503.

In many embodiments, ozone supply system 505 can control how much ozone (e.g. a quantity of ozone) that ozone generator 401 (FIG. 4) generates. In some embodiments, ozone supply system 505 can selectively activate and deactivate ozone generator 401 (FIG. 4) to regulate how much ozone that ozone generator 401 (FIG. 4) generates.

In some embodiments, ozone supply system 505 can control how much ozone (e.g. a quantity of ozone) that ozone generator 401 (FIG. 4) generates based on an ambient temperature proximal to (e.g., within 2 meters of, within 10 meters of, within 50 meters of) or at a location where the ozone generated by ozone generator 401 is to be applied. For example, ozone supply system 505 can establish and/or adjust (e.g., in real time) how much ozone (e.g. a quantity of ozone) that ozone generator 401 (FIG. 4) generates based on the ambient temperature. In further embodiments, ozone supply system 505 can receive the ambient temperature from temperature sensor 407 (FIG. 4).

Controlling how much ozone (e.g. a quantity of ozone) that ozone generator 401 (FIG. 4) generates based on an ambient temperature proximal to (e.g., within 2 meters of, within 10 meters of, within 50 meters of) or at a location where the ozone generated by ozone generator 401 is to be applied can be advantageous because a concentration of ozone in a volume is temperature dependent. For example, as temperature increases, ozone molecules will dissociate more quickly as the ozone molecules collide more frequently. Accordingly, ozone supply system 505 can increase how much ozone (e.g. a quantity of ozone) that ozone generator 401 (FIG. 4) generates to maintain a desired quantity of ozone.

In some embodiments, ozone supply system 505 can control how much ozone (e.g. a quantity of ozone) that ozone generator 401 (FIG. 4) generates based on detecting a weather event proximal to (e.g., within 2 meters of, within 10 meters of, within 50 meters of) or at a location where the ozone generated by ozone generator 401 is to be applied. For example, ozone supply system 505 can establish and/or adjust (e.g., in real time) how much ozone (e.g. a quantity of ozone) that ozone generator 401 (FIG. 4) generates based on detecting the weather event. In further embodiments, ozone supply system 505 can receive a notification of the weather event from one or more of weather event sensor(s) 408 (FIG. 4).

Controlling how much ozone (e.g. a quantity of ozone) that ozone generator 401 (FIG. 4) generates based on detecting a weather event proximal to (e.g., within 2 meters of, within 10 meters of, within 50 meters of) or at a location where the ozone generated by ozone generator 401 is to be applied can be advantageous because weather events (e.g., storms, toxic pollution events, etc.) can affect how much ozone is needed to adequately sterilize the substance(s) to which the ozone is to be applied (e.g., the water made available to the user of system 300 (FIG. 3) by water supply system 301 (FIG. 3) and/or (ii) the interior surface(s) of water generating unit 306 (FIG. 3), heater 307 (FIG. 3), desiccation device 308 (FIG. 3), and/or condenser 309 (FIG. 3)). For example, a dust storm can increase the presence of particles in the substance(s) to which the ozone is to be applied (e.g., the water made available to the user of system 300 (FIG. 3) by water supply system 301 (FIG. 3) and/or (ii) the interior surface(s) of water generating unit 306 (FIG. 3), heater 307 (FIG. 3), desiccation device 308 (FIG. 3), and/or condenser 309 (FIG. 3)). Accordingly, ozone supply system 505 can increase how much ozone (e.g. a quantity of ozone) that ozone generator 401 (FIG. 4) generates to compensate for the increased presence of particles in the substance(s).

In some embodiments, ozone supply system 505 can control how much ozone (e.g. a quantity of ozone) that ozone generator 401 (FIG. 4) generates such that (i) a concentration of the ozone remains below a maximum concentration value and/or (ii) a CT value of the ozone remains above a minimum CT value when the ozone is applied to the substance(s) to which the ozone is to be applied (e.g., the water made available to the user of system 300 (FIG. 3) by water supply system 301 (FIG. 3) and/or (ii) the interior surface(s) of water generating unit 306 (FIG. 3), heater 307 (FIG. 3), desiccation device 308 (FIG. 3), and/or condenser 309 (FIG. 3)). CT value can refer to a product of the concentration and exposure time of the ozone to the substance(s) to which the ozone is to be applied (e.g., the water made available to the user of system 300 (FIG. 3) by water supply system 301 (FIG. 3) and/or (ii) the interior surface(s) of water generating unit 306 (FIG. 3), heater 307 (FIG. 3), desiccation device 308 (FIG. 3), and/or condenser 309 (FIG. 3)).

In many embodiments, the maximum concentration value can be set to a value that prevents ozone from remaining in the water made available to the user of system 300 (FIG. 3) by water supply system 301 (FIG. 3) when the user drinks the water. That is, the maximum concentration value can be set to ensure that any ozone in the water is dissociated before the water is used by the user of system 300 (FIG. 3). For example, in some embodiments, the maximum concentration value can be 0.4 parts per million. In these or other embodiments, the minimum CT value can be set to a value that ensures the ozone is lethal to any toxic or otherwise undesirable organism or organisms (e.g., a virus, a bacterium, an alga, etc.) in the water made available to the user of system 300 (FIG. 3) by water supply system 301 (FIG. 3). For example, in some embodiments, the minimum CT value can be 2. Accordingly, restricting the concentration value and/or CT value of the ozone can ensure the water is safe for the user of system 300 (FIG. 3) to drink.

In some embodiments, ozone supply system 505 can control how much ozone (e.g. a quantity of ozone) that ozone generator 401 (FIG. 4) generates based on detecting ozone and/or an ozone concentration proximal to (e.g., within 2 meters of, within 10 meters of, within 50 meters of) or at a location where the ozone generated by ozone generator 401 is to be applied. For example, ozone supply system 505 can establish and/or adjust (e.g., in real time) how much ozone (e.g. a quantity of ozone) that ozone generator 401 (FIG. 4) generates based on detecting ozone and/or the ozone concentration. In further embodiments, ozone supply system 505 can receive notifications of detected ozone and/or the ozone concentration from ozone sensor(s) 411 (FIG. 4).

In some embodiments, ozone supply system 505 can control how much ozone (e.g. a quantity of ozone) that ozone generator 401 (FIG. 4) generates based on detecting micro-organisms and/or a micro-organism concentration proximal to (e.g., within 2 meters of, within 10 meters of, within 50 meters of) or at a location where the ozone generated by ozone generator 401 is to be applied. For example, ozone supply system 505 can establish and/or adjust (e.g., in real time) how much ozone (e.g. a quantity of ozone) that ozone generator 401 (FIG. 4) generates based on detecting ozone and/or the micro-organism concentration. In further embodiments, ozone supply system 505 can receive notifications of detection of micro-organisms and/or the micro-organism concentration from microbial sensor(s) 412 (FIG. 4).

In many embodiments, ozone scheduling system 506 can control when ozone generator 401 (FIG. 4) generates ozone. In some embodiments, ozone scheduling system 506 can selectively activate and deactivate ozone generator 401 (FIG. 4) to regulate when ozone generator 401 (FIG. 4) generates ozone.

For example, in many embodiments, ozone scheduling system 506 can cause ozone generator 401 (FIG. 4) to generate ozone for one or more periods of time at one or more times of day and on one or more days of the week. In these or other embodiments, ozone scheduling system 506 can cause ozone generator 506 to generate ozone for one or more periods of time at one or more regular intervals (e.g., every minute, every quarter hour, every half hour, every hour, etc.). In these or other embodiments, ozone scheduling system 506 can cause ozone generator 401 (FIG. 4) not to generate ozone for one or more periods of time at one or more times of day and on one or more days of the week, and/or for one or more periods of time at one or more regular intervals (e.g., every minute, every quarter hour, every half hour, every hour, etc.).

In some embodiments, ozone scheduling system 506 can control when ozone generator 401 (FIG. 4) generates ozone based on detecting a weather event proximal to (e.g., within 2 meters of, within 10 meters of, within 50 meters of) or at a location where the ozone generated by ozone generator 401 is to be applied (e.g., in real time). For example, in various embodiments, ozone scheduling system 506 can cause ozone generator 401 (FIG. 4) to generate ozone in response to receiving a notification of a weather event from one or more of weather event sensor(s) 408 (FIG. 4). In further embodiments, ozone scheduling system 506 can receive the notification of the weather event from one or more of weather event sensor(s) 408 (FIG. 4). Causing ozone generator 401 (FIG. 4) to generate ozone when a weather event is detected proximal to (e.g., within 2 meters of, within 10 meters of, within 50 meters of) or at a location where the ozone generated by ozone generator 401 is to be applied can be advantageous because weather events (e.g., storms, toxic pollution events, etc.) can contaminate the substance(s) to which the ozone is to be applied (e.g., the water made available to the user of system 300 (FIG. 3) by water supply system 301 (FIG. 3) and/or (ii) the interior surface(s) of water generating unit 306 (FIG. 3), heater 307 (FIG. 3), desiccation device 308 (FIG. 3), and/or condenser 309 (FIG. 3)).

In some embodiments, ozone schedule system 506 can control when ozone generator 401 (FIG. 4) generates ozone based on detecting that maintenance has been performed and completed on water supply system 301 of FIG. 3 (e.g., water generating unit 310 (FIG. 3)). For example, in various embodiments, ozone scheduling system 506 can cause ozone generator 401 (FIG. 4) to generate ozone in response to determining that a maintenance event has occurred. In some embodiments, ozone scheduling system 506 can receive a notification of a maintenance event from maintenance sensor 409 (FIG. 4). Causing ozone generator 401 (FIG. 4) to generate ozone when a maintenance event is detected can be advantageous because maintenance events can contaminate the substance(s) to which the ozone is to be applied (e.g., the water made available to the user of system 300 (FIG. 3) by water supply system 301 (FIG. 3) and/or (ii) the interior surface(s) of water generating unit 306 (FIG. 3), heater 307 (FIG. 3), desiccation device 308 (FIG. 3), and/or condenser 309 (FIG. 3)).

In some embodiments, ozone scheduling system 506 can control when ozone generator 401 (FIG. 4) generates ozone based on detecting a non-use interval of the water made available to the user of system 300 (FIG. 3) by water supply system 301 (FIG. 3). For example, in various embodiments, ozone scheduling system 506 can cause ozone generator 401 (FIG. 4) to generate ozone in response to determining that a non-use interval has elapsed. A non-use interval can refer to a predetermined period of time since water made available to the user of system 300 (FIG. 3) by water supply system 301 (FIG. 3) has been used. The predetermined period of time can be set to be sufficiently often to prevent contaminants from building up in the water made available to the user of system 300 (FIG. 3) by water supply system 301 (FIG. 3) in between uses. In some embodiments, ozone scheduling system 506 can receive notification(s) of when water made available to the user of system 300 (FIG. 3) by water supply system 301 (FIG. 3) is used from water use sensor 410 (FIG. 4). Then, ozone scheduling system 506 can track how much time has elapsed since receiving a most recent notification of when water made available to the user of system 300 (FIG. 3) by water supply system 301 (FIG. 3) is used.

In some embodiments, ozone schedule system 506 can control when ozone generator 401 (FIG. 4) generates ozone based on detecting ozone and/or an ozone concentration proximal to (e.g., within 2 meters of, within 10 meters of, within 50 meters of) or at a location where the ozone generated by ozone generator 401 is to be applied. For example, in various embodiments, ozone scheduling system 506 can cause ozone generator 401 (FIG. 4) to generate ozone in response to detecting ozone proximal to (e.g., within 2 meters of, within 10 meters of, within 50 meters of) or at a location where the ozone generated by ozone generator 401 is to be applied. In some embodiments, ozone scheduling system 506 can receive a notification of detected ozone from ozone sensor(s) 411 (FIG. 4). Further, in various embodiments, ozone scheduling system 506 can cause ozone generator 401 (FIG. 4) to generate ozone as a function of the ozone concentration and an ozone decomposition rate. In some embodiments, ozone scheduling system 506 can receive the ozone concentration from ozone sensor(s) 411 (FIG. 4).

In some embodiments, ozone schedule system 506 can control when ozone generator 401 (FIG. 4) generates ozone based on detecting micro-organisms and/or a micro-organism concentration proximal to (e.g., within 2 meters of, within 10 meters of, within 50 meters of) or at a location where the ozone generated by ozone generator 401 is to be applied. For example, in various embodiments, ozone scheduling system 506 can cause ozone generator 401 (FIG. 4) to generate ozone in response to detecting micro-organisms proximal to (e.g., within 2 meters of, within 10 meters of, within 50 meters of) or at a location where the ozone generated by ozone generator 401 is to be applied. In some embodiments, ozone scheduling system 506 can receive a notification of detected micro-organisms from microbial sensor(s) 411 (FIG. 4). Further, in various embodiments, ozone scheduling system 506 can cause ozone generator 401 (FIG. 4) to generate ozone as a function of the micro-organism concentration and a lethality time. In some embodiments, ozone scheduling system 506 can receive the micro-organism concentration from microbial sensor(s) 412 (FIG. 4).

In many embodiments, feed gas supply system 507 can control when blower 405 (FIG. 4) provides feed gas to ozone generator 401 (FIG. 4). In some embodiments, ozone scheduling system 506 can selectively activate and deactivate blower 405 (FIG. 4) to regulate when blower 405 (FIG. 4) provides feed gas to ozone generator 401 (FIG. 4). In many embodiments, feed gas supply system 507 can communicate with ozone supply system 505 and/or ozone scheduling system 506 to coordinate control of blower 405 (FIG. 4) providing feed gas to ozone generator 401 (FIG. 4) with control of ozone generator 401 (FIG. 4) by ozone supply system 505 and/or ozone scheduling system 506.

In many embodiments, feed gas scheduling system 508 can control a feed rate with which blower 405 (FIG. 4) provides feed gas to ozone generator 401 (FIG. 4). In some embodiments, ozone scheduling system 506 can selectively activate and deactivate blower 405 (FIG. 4) to regulate when blower 405 (FIG. 4) provides feed gas to ozone generator 401 (FIG. 4). In many embodiments, feed gas scheduling system 507 can communicate with ozone supply system 505 and/or ozone scheduling system 506 to coordinate control of blower 405 (FIG. 4) controlling a feed rate of feed gas provided to ozone generator 401 (FIG. 4) with control of ozone generator 401 (FIG. 4) by ozone supply system 505 and/or ozone scheduling system 506.

In many embodiments, ozone target system 509 can control to where the ozone generated by ozone generator 401 is applied. In these embodiments, ozone target system 509 can control the opening and closing of the valve(s) configured to selectively permit and impede the flow of the ozone generated by ozone generator 401 to control where the ozone generated by ozone generator 401 is applied.

For convenience, the functionality of system 300 generally is described herein as it relates particularly to one user, but in many embodiments, the functionality of system 300 can be extended to multiple users, at the same or at different times. Further, although system 300 and/or ozone generation system 302 are discussed with respect to ozone, in other embodiments, one or more other chemicals can be generated, controlled, and applied, such as, for example, to one or more substance(s) (e.g., water). Further still, although the water made available to the user of system 300 (FIG. 3) is generally described herein as being in a liquid form, in other embodiments, the water can be made available to the user of system 300 (FIG. 3) in a solid or gaseous form.

Figure 6:
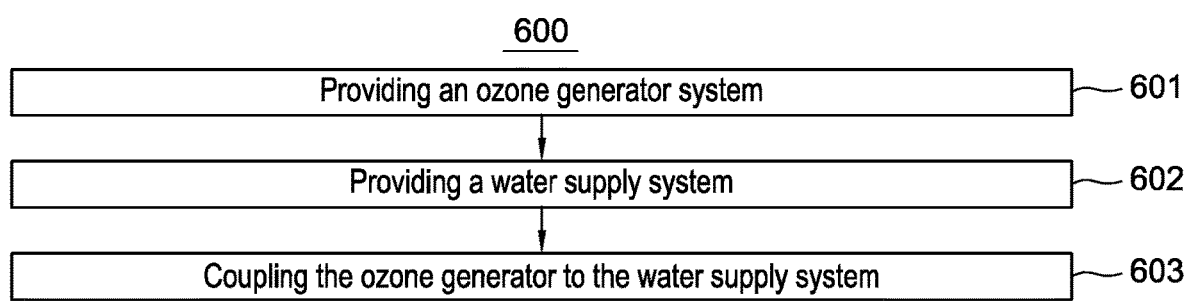
FIG. 6 illustrates a flow chart for a method of providing a system, according to an embodiment.

Turning ahead now in the drawings, FIG. 6 illustrates a flow chart for an embodiment of a method 600 of providing (e.g., manufacturing) a system. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of the method 600 can be performed in any other suitable order. In still other embodiments, one or more of the activities in method 600 can be combined or skipped. In many embodiments, the system can be similar or identical to system 300 (FIG. 3).

Figure 7:
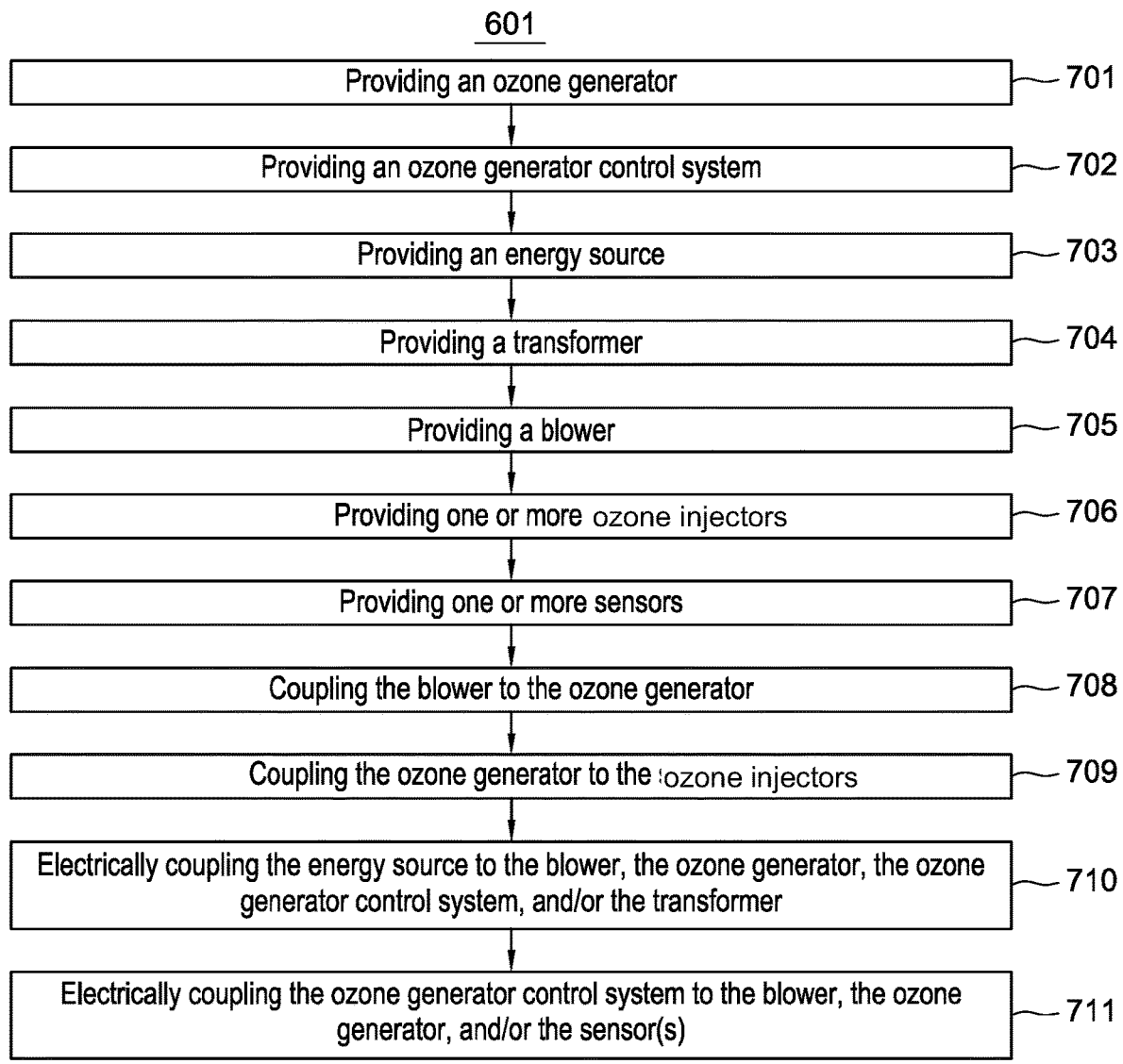
FIG. 7 illustrates a flow chart for an exemplary activity of providing an ozone generator system, according to the embodiment of FIG. 6.

In many embodiments, method 600 can comprise activity 601 of providing an ozone generator system. In some embodiments, the ozone generator system can be similar or identical to ozone generator system 302 (FIG. 3). FIG. 7 illustrates an exemplary activity 601, according to the embodiment of FIG. 6.

In many embodiments, activity 601 can comprise activity 701 of providing an ozone generator. In some embodiments, the ozone generator can be similar or identical to ozone generator 401 (FIG. 4).

Figure 8:
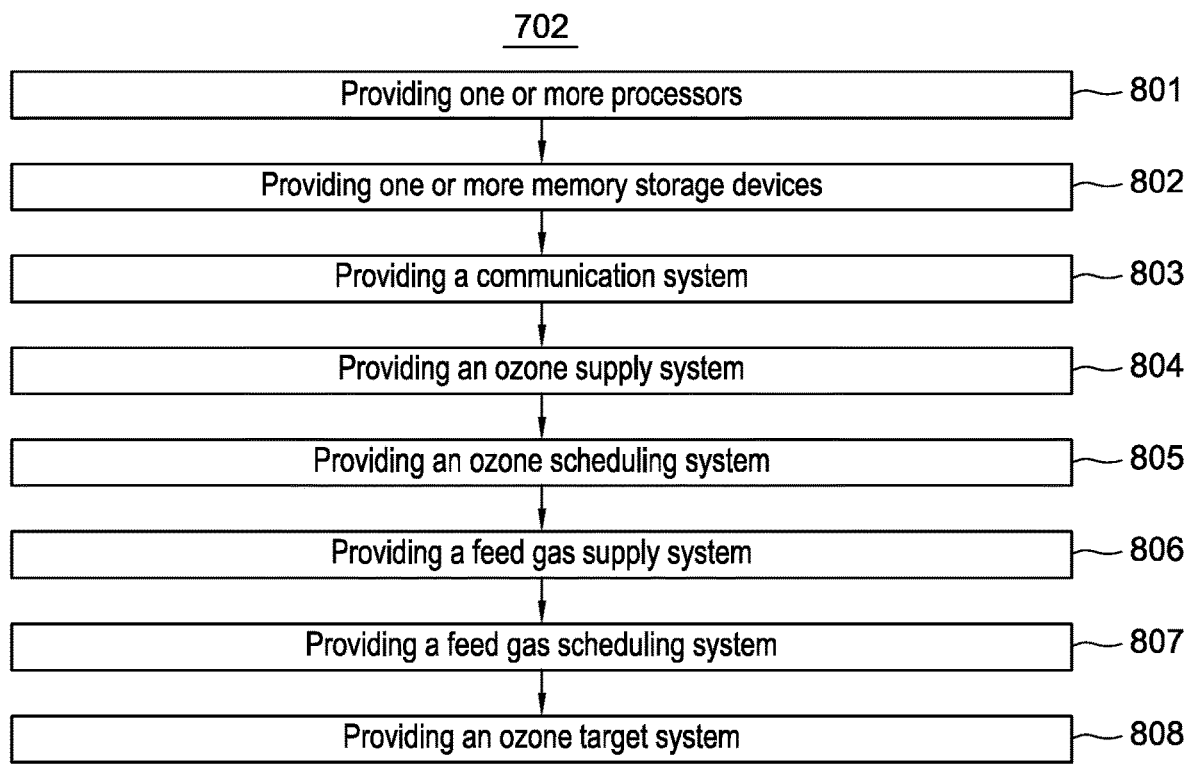
FIG. 8 illustrates a flow chart for an exemplary activity of providing an ozone generator control system, according to the embodiment of FIG. 6.

In many embodiments, activity 601 can comprise activity 702 of providing an ozone generator control system. In some embodiments, the ozone generator control system can be similar or identical to ozone generator control system 402 (FIG. 4). FIG. 8 illustrates an exemplary activity 702, according to the embodiment of FIG. 6.

In many embodiments, activity 702 can comprise activity 801 of providing one or more processors. In some embodiments, the processor(s) can be similar or identical to processor(s) 501 (FIG. 5).

In many embodiments, activity 702 can comprise activity 802 of providing one or more memory storage devices. In some embodiments, the memory storage device(s) can be similar or identical to memory storage device(s) 502 (FIG. 5).

In many embodiments, activity 702 can comprise activity 803 of providing a communication system. In some embodiments, the communication system can be similar or identical to communication system 504 (FIG. 5).

In many embodiments, activity 702 can comprise activity 804 of providing an ozone supply system. In some embodiments, the ozone supply system can be similar or identical to ozone supply system 505 (FIG. 5).

In many embodiments, activity 702 can comprise activity 805 of providing an ozone scheduling system. In some embodiments, the ozone scheduling system can be similar or identical to ozone scheduling system 506 (FIG. 5).

In many embodiments, activity 702 can comprise activity 806 of providing a feed gas supply system. In some embodiments, the feed gas supply system can be similar or identical to feed gas supply system 507 (FIG. 5). In some embodiments, activity 806 can be omitted.

In many embodiments, activity 702 can comprise activity 807 of providing a feed gas scheduling system. In some embodiments, the feed gas scheduling system can be similar or identical to feed gas scheduling system 508 (FIG. 5). In some embodiments, activity 807 can be omitted.

In many embodiments, activity 702 can comprise activity 808 of providing an ozone target system. In some embodiments, the ozone target system can be similar or identical to ozone target system 509 (FIG. 5). In some embodiments, activity Turning now back to FIG. 7, in many embodiments, activity 601 can comprise activity 703 of providing an energy source. In some embodiments, the energy source can be similar or identical to energy source 403 (FIG. 4).

In many embodiments, activity 601 can comprise activity 704 of providing a transformer. In some embodiments, the transformer can be similar or identical to transformer 404 (FIG. 4). In some embodiments, activity 704 can be omitted.

In many embodiments, activity 601 can comprise activity 705 of providing a blower. In some embodiments, the blower can be similar or identical to blower 405 (FIG. 4). In some embodiments, activity 705 can be omitted.

In many embodiments, activity 601 can comprise activity 706 of providing one or more ozone injectors. In some embodiments, the ozone injector(s) can be similar or identical to ozone injector(s) 406 (FIG. 4). In some embodiments, activity 706 can be omitted.

In many embodiments, activity 601 can comprise activity 707 of providing one or more sensors. In some embodiments, the sensor(s) can be similar or identical to temperature sensor 407 (FIG. 4), weather event sensor(s) 408 (FIG. 4), maintenance sensor 409 (FIG. 4), and/or water use sensor 410 (FIG. 4). In some embodiments, activity 707 can be omitted.

In many embodiments, activity 601 can comprise activity 708 of coupling the blower to the ozone generator. In some embodiments, activity 708 can be omitted.

In many embodiments, activity 601 can comprise activity 709 of coupling the ozone generator to the ozone injector(s). In some embodiments, activity 709 can be omitted.

In many embodiments, activity 601 can comprise activity 710 of electrically coupling the energy source to the blower, the ozone generator, the ozone generator control system, and/or the transformer.

In many embodiments, activity 602 can comprise activity 711 of electrically coupling the ozone generator control system to the blower, the ozone generator, and/or the sensor(s).

Figure 9:
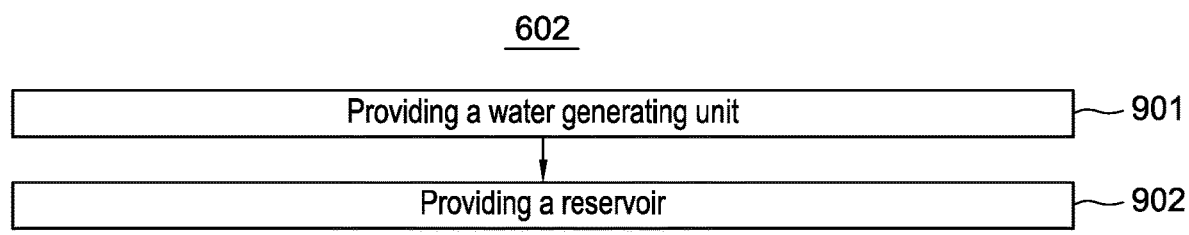
FIG. 9 illustrates a flow chart for an exemplary activity of providing a water supply system, according to the embodiment of FIG. 6.

Turning now back to FIG. 6, in many embodiments, method 600 can comprise activity 602 of providing a water supply system. The water supply system can be similar or identical to water supply system 301 (FIG. 3). In some embodiments, activity 602 can be omitted. FIG. 9 illustrates an exemplary activity 602, according to the embodiment of FIG. 6.

In many embodiments, activity 602 can comprise activity 901 of providing a water generating unit. In some embodiments, the water generating unit can be similar or identical to water generating unit 306 (FIG. 3). In some embodiments, activity 901 can be omitted.

In many embodiments, activity 602 can comprise activity 902 of providing a reservoir. In some embodiments, the reservoir can be similar or identical to reservoir 304 (FIG. 3). In some embodiments, activity 902 can be omitted.

Turning again back to FIG. 6, in many embodiments, method 600 can comprise activity 603 of coupling the ozone generator to the water supply system. In some embodiments, activity 603 can be omitted.

Figure 10:
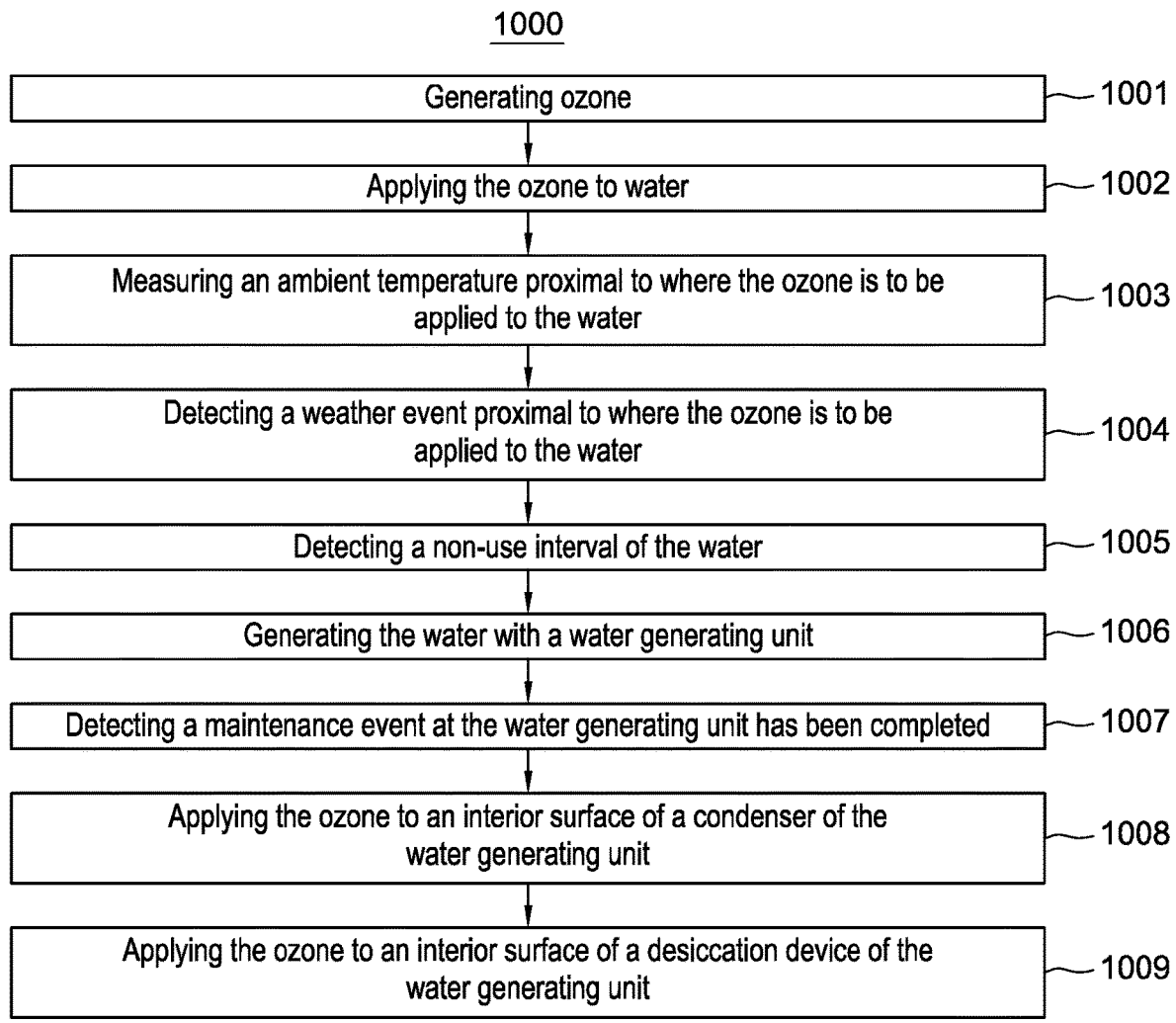
FIG. 10 illustrates a flow chart for an embodiment of a method.

Turning ahead now in the drawings, FIG. 10 illustrates a flow chart for an embodiment of a method 1000. Method 1000 is merely exemplary and is not limited to the embodiments presented herein. Method 1000 can be employed in many different embodiments or examples not specifically depicted or described herein. In some embodiments, the activities of method 1000 can be performed in the order presented. In other embodiments, the activities of the method 1000 can be performed in any other suitable order. In still other embodiments, one or more of the activities in method 1000 can be combined or skipped.

Figure 11:
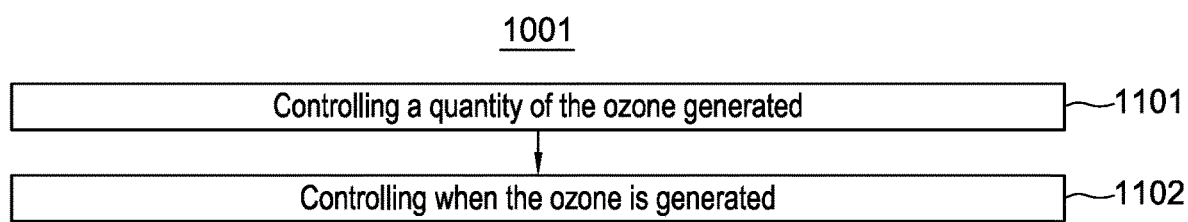
FIG. 11 illustrates a flow chart for an exemplary activity of generating ozone, according to the embodiment of FIG. 10.

In many embodiments, method 1000 can comprise activity 1001 of generating ozone. In some embodiments, performing activity 1001 can be similar or identical to generating ozone as described above with respect to system 300 (FIG. 3) and/or ozone generator system 302 (FIG. 3). In some embodiments, activity 1001 can be repeated one or more times. FIG. 11 illustrates an exemplary activity 1001, according to the embodiment of FIG. 10.

Figure 12:
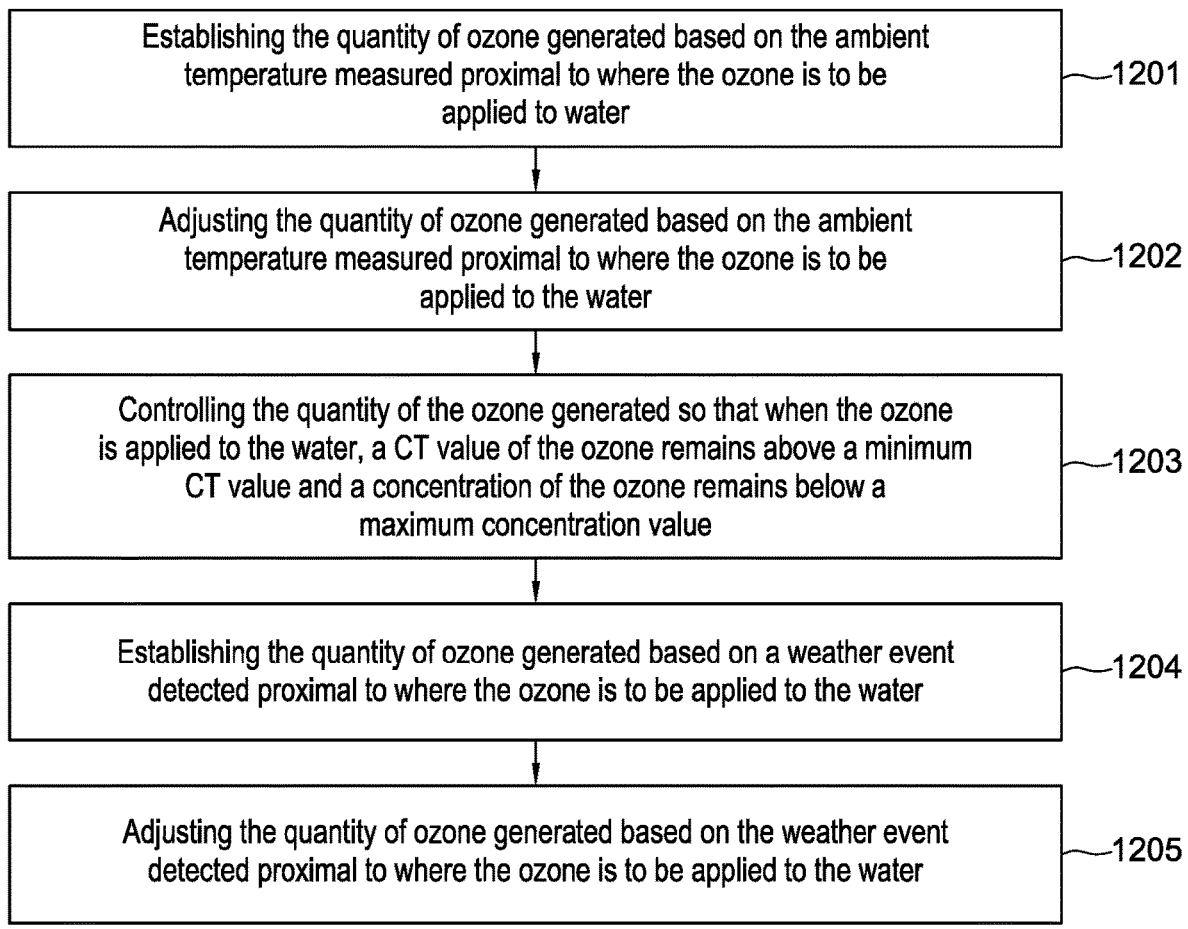
FIG. 12 illustrates a flow chart for an exemplary activity of controlling a quantity of the ozone generated, according to the embodiment of FIG. 10.

In many embodiments, activity 1001 can comprise activity 1101 of controlling a quantity of the ozone generated. In some embodiments, performing activity 1101 can be similar or identical to controlling a quantity of the ozone generated as described above with respect to system 300 (FIG. 3) and/or ozone generator system 302 (FIG. 3). In some embodiments, activity 1101 can be repeated one or more times. FIG. 12 illustrates an exemplary activity 1101, according to the embodiment of FIG. 10.

In many embodiments, activity 1101 can comprise activity 1201 of establishing the quantity of ozone generated based on the ambient temperature measured proximal to where the ozone is to be applied to water. In some embodiments, performing activity 1201 can be similar or identical to establishing the quantity of ozone generated based on an ambient temperature measured proximal to where the ozone is to be applied to the water. In many embodiments, activity 1201 can be performed after activity 1003 (FIG. 10). In some embodiments, activity 1201 can be repeated one or more times.

In many embodiments, activity 1101 can comprise activity 1202 of adjusting the quantity of ozone generated based on the ambient temperature measured proximal to where the ozone is to be applied to the water. In some embodiments, performing activity 1202 can be similar or identical to adjusting the quantity of ozone generated based on the ambient temperature measured proximal to where the ozone is to be applied to the water. In many embodiments, activity 1201 can be performed after activity 1003 (FIG. 10). In some embodiments, when activity 1101 comprises activity 1202, activity 1201 can be omitted, and vice versa. In some embodiments, activity 1202 can be repeated one or more times.

In many embodiments, activity 1101 can comprise activity 1203 of controlling the quantity of the ozone generated so that when the ozone is applied to the water, a CT value of the ozone remains above a minimum CT value and a concentration of the ozone remains below a maximum concentration value. In some embodiments, performing activity 1203 can be similar or identical to controlling the quantity of the ozone generated so that when the ozone is applied to the water, a CT value of the ozone remains above a minimum CT value and a concentration of the ozone remains below a maximum concentration value as described above with respect to system 300 (FIG. 3) and/or ozone generator system 302 (FIG. 3). In these or other embodiments, the minimum CT value can be similar or identical to the minimum CT value described above with respect to system 300 (FIG. 3) and/or ozone generator system 302 (FIG. 3); and/or the maximum concentration value can be similar or identical to the maximum concentration value described above with respect to system 300 (FIG. 3) and/or ozone generator system 302 (FIG. 3). In some embodiments, activity 1203 can be repeated one or more times.

In many embodiments, activity 1101 can comprise activity 1204 of establishing the quantity of ozone generated based on a weather event detected proximal to where the ozone is to be applied to the water. In some embodiments, performing activity 1204 can be similar or identical to establishing the quantity of ozone generated based on the weather event detected proximal to where the ozone is to be applied to the water. In further embodiments, the weather event can be similar or identical to one of the weather event(s) described above with respect to system 300 (FIG. 3) and/or ozone generator system 302 (FIG. 3). In many embodiments, activity 1204 can be performed after activity 1004 (FIG. 10). In some embodiments, activity 1204 can be repeated one or more times.

In many embodiments, activity 1101 can comprise activity 1205 of adjusting the quantity of ozone generated based on the weather event detected proximal to where the ozone is to be applied to the water. In some embodiments, performing activity 1205 can be similar or identical to adjusting the quantity of ozone generated based on the weather event detected proximal to where the ozone is to be applied to the water. In many embodiments, activity 1205 can be performed after activity 1004 (FIG. 10). In further embodiments, when activity 1101 comprises activity 1205, activity 1204 can be omitted, and vice versa. In some embodiments, activity 1205 can be repeated one or more times.

In many embodiments, activity 1101 can comprise an activity of establishing the quantity of ozone generated based on detecting present ozone and/or the concentration of present ozone proximal to where the ozone is to be applied to the water. In some embodiments, performing the activity of establishing the quantity of ozone generated based on detecting present ozone and/or the concentration of present ozone proximal to where the ozone is to be applied to the water can be similar or identical to establishing the quantity of ozone generated based on detecting present ozone and/or the concentration of present ozone proximal to where the ozone is to be applied to the water as described above with respect to system 300 (FIG. 3) and/or ozone generator system 302 (FIG. 3). In some embodiments, the activity of establishing the quantity of ozone generated based on detecting present ozone and/or the concentration of present ozone proximal to where the ozone is to be applied to the water can be repeated one or more times.

In many embodiments, activity 1101 can comprise an activity of adjusting the quantity of ozone generated based on detecting present ozone and/or a concentration of the present ozone proximal to where the ozone is to be applied to the water. In some embodiments, performing the activity of adjusting the quantity of ozone generated based on detecting present ozone and/or the concentration of present ozone proximal to where the ozone is to be applied to the water can be similar or identical to adjusting the quantity of ozone generated based on detecting present ozone and/or the concentration of present ozone proximal to where the ozone is to be applied to the water as described above with respect to system 300 (FIG. 3) and/or ozone generator system 302 (FIG. 3). In some embodiments, the activity of adjusting the quantity of ozone generated based on detecting present ozone and/or a concentration of the present ozone proximal to where the ozone is to be applied to the water can be repeated one or more times.

In many embodiments, activity 1101 can comprise an activity of establishing the quantity of ozone generated based on detecting micro-organisms and/or the concentration of micro-organisms proximal to where the ozone is to be applied to the water. In some embodiments, performing the activity of establishing the quantity of ozone generated based on detecting micro-organisms and/or the concentration of micro-organisms proximal to where the ozone is to be applied to the water can be similar or identical to establishing the quantity of ozone generated based on detecting micro-organisms and/or the concentration of micro-organisms proximal to where the ozone is to be applied to the water as described above with respect to system 300 (FIG. 3) and/or ozone generator system 302 (FIG. 3). In some embodiments, the activity of establishing the quantity of ozone generated based on detecting micro-organisms and/or the concentration of micro-organisms proximal to where the ozone is to be applied to the water can be repeated one or more times.

In many embodiments, activity 1101 can comprise an activity of adjusting the quantity of ozone generated based on detecting micro-organisms and/or the concentration of micro-organisms proximal to where the ozone is to be applied to the water. In some embodiments, performing the activity of adjusting the quantity of ozone generated based on detecting micro-organisms and/or the concentration of micro-organisms proximal to where the ozone is to be applied to the water can be similar or identical to adjusting the quantity of ozone generated based on detecting micro-organisms and/or the concentration of micro-organisms proximal to where the ozone is to be applied to the water as described above with respect to system 300 (FIG. 3) and/or ozone generator system 302 (FIG. 3). In some embodiments, the activity of adjusting the quantity of ozone generated based on detecting micro-organisms and/or the concentration of micro-organisms proximal to where the ozone is to be applied to the water can be repeated one or more times.

Figure 13:
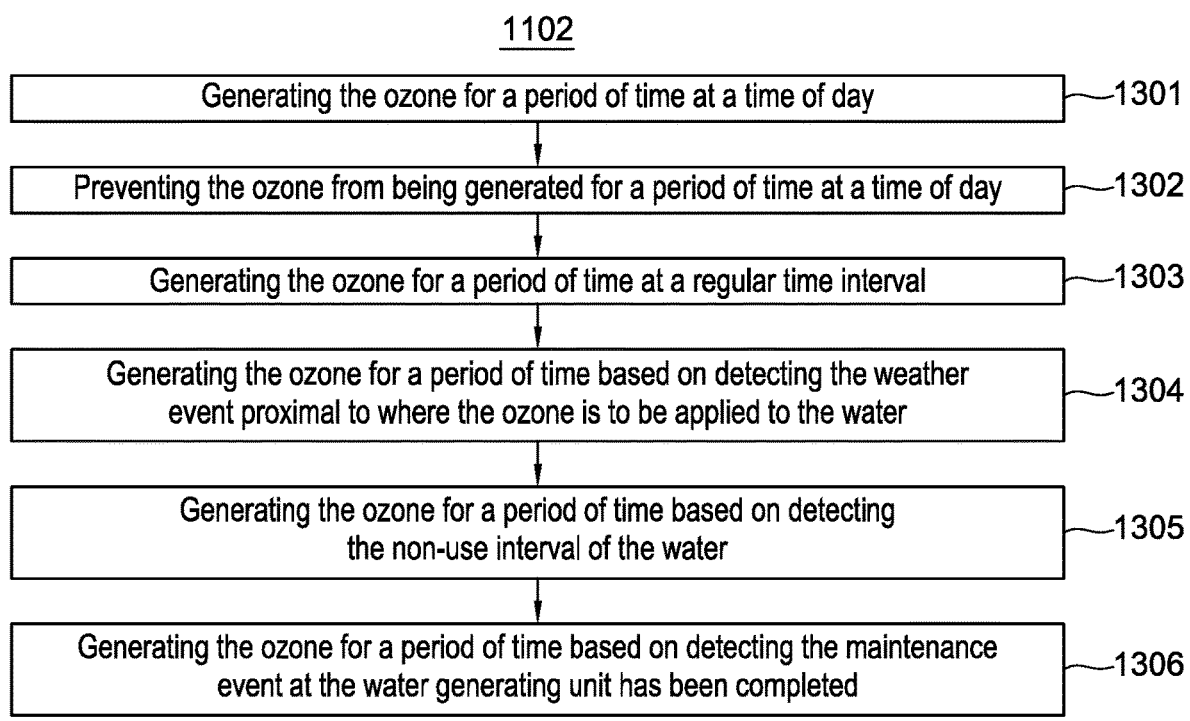
FIG. 13 illustrates a flow chart for an exemplary activity of controlling when the ozone is generated, according to the embodiment of FIG. 10.

Turning now back to FIG. 11, in many embodiments, activity 1001 can comprise activity 1102 of controlling when the ozone is generated. In some embodiments, performing activity 1102 can be similar or identical to controlling when the ozone is generated as described above with respect to system 300 (FIG. 3) and/or ozone generator system 302 (FIG. 3). In some embodiments, activity 1102 can be repeated one or more times. FIG. 13 illustrates an exemplary activity 1102, according to the embodiment of FIG. 10.

In many embodiments, activity 1102 can comprise activity 1301 of generating the ozone for a period of time at a time of day. In some embodiments, performing activity 1301 can be similar or identical to generating the ozone for a period of time at a time of day as described above with respect to system 300 (FIG. 3) and/or ozone generator system 302 (FIG. 3). In some embodiments, activity 1301 can be repeated one or more times.

In many embodiments, activity 1102 can comprise activity 1302 of preventing the ozone from being generated for a period of time at a time of day. In some embodiments, performing activity 1302 can be similar or identical to preventing the ozone from being generated for a period of time at a time of day as described above with respect to system 300 (FIG. 3) and/or ozone generator system 302 (FIG. 3). In some embodiments, activity 1302 can be repeated one or more times.

In many embodiments, activity 1102 can comprise activity 1303 of generating the ozone for a period of time at a regular time interval. In some embodiments, performing activity 1303 can be similar or identical to generating the ozone for a period of time at a regular time interval as described above with respect to system 300 (FIG. 3) and/or ozone generator system 302 (FIG. 3). In some embodiments, activity 1303 can be repeated one or more times.

In many embodiments, activity 1102 can comprise activity 1304 of generating the ozone for a period of time based on detecting the weather event proximal to where the ozone is to be applied to the water. In some embodiments, performing activity 1304 can be similar or identical to generating the ozone for a period of time based on detecting the weather event proximal to where the ozone is to be applied to the water as described above with respect to system 300 (FIG. 3) and/or ozone generator system 302 (FIG. 3). In some embodiments, activity 1304 can be repeated one or more times.

In many embodiments, activity 1102 can comprise activity 1305 of generating the ozone for a period of time based on detecting the non-use interval of the water. In some embodiments, performing activity 1305 can be similar or identical to generating the ozone for a period of time based on detecting the non-use interval of the water as described above with respect to system 300 (FIG. 3) and/or ozone generator system 302 (FIG. 3). In some embodiments, activity 1305 can be repeated one or more times.

In many embodiments, activity 1102 can comprise activity 1306 of generating the ozone for a period of time based on detecting the maintenance event at the water generating unit has been completed. In some embodiments, performing activity 1306 can be similar or identical to generating the ozone for a period of time based on detecting the maintenance event at the water generating unit has been completed as described above with respect to system 300 (FIG. 3) and/or ozone generator system 302 (FIG. 3). In some embodiments, activity 1306 can be repeated one or more times.

In many embodiments, activity 1101 can comprise an activity of generating the ozone for a period of time based on detecting present ozone and/or the concentration of present ozone proximal to where the ozone is to be applied to the water. In some embodiments, performing the activity of generating the ozone for a period of time based on detecting present ozone and/or the concentration of present ozone proximal to where the ozone is to be applied to the water can be similar or identical to generating the ozone for a period of time based on detecting present ozone and/or the concentration of present ozone proximal to where the ozone is to be applied to the water as described above with respect to system 300 (FIG. 3) and/or ozone generator system 302 (FIG. 3). In some embodiments, the activity of generating the ozone for a period of time based on detecting present ozone and/or the concentration of present ozone proximal to where the ozone is to be applied to the water can be repeated one or more times.

In many embodiments, activity 1101 can comprise an activity of generating the ozone for a period of time based on detecting micro-organisms and/or the concentration of micro-organisms proximal to where the ozone is to be applied to the water. In some embodiments, performing the activity of generating the ozone for a period of time based on detecting micro-organisms and/or the concentration of micro-organisms proximal to where the ozone is to be applied to the water can be similar or identical to generating the ozone for a period of time based on detecting micro-organisms and/or the concentration of micro-organisms proximal to where the ozone is to be applied to the water as described above with respect to system 300 (FIG. 3) and/or ozone generator system 302 (FIG. 3). In some embodiments, the activity of generating the ozone for a period of time based on detecting micro-organisms and/or the concentration of micro-organisms proximal to where the ozone is to be applied to the water can be repeated one or more times.

Turning now back to FIG. 10, in many embodiments, method 1000 can comprise activity 1002 of applying the ozone to water. In some embodiments, performing activity 1002 can be similar or identical to applying the ozone to water as described above with respect to system 300 (FIG. 3) and/or ozone generator system 302 (FIG. 3). In some embodiments, activity 1002 can be repeated one or more times.

In many embodiments, method 1000 can comprise activity 1003 of measuring the ambient temperature proximal to where the ozone is to be applied to the water. In some embodiments, performing activity 1003 can be similar or identical to measuring an ambient temperature proximal to where the ozone is to be applied to the water as described above with respect to system 300 (FIG. 3) and/or ozone generator system 302 (FIG. 3). In some embodiments, activity 1003 can be repeated one or more times.

In many embodiments, method 1000 can comprise activity 1004 of detecting the weather event proximal to where the ozone is to be applied to the water. In some embodiments, performing activity 1004 can be similar or identical to detecting the weather event proximal to where the ozone is to be applied to the water as described above with respect to system 300 (FIG. 3) and/or ozone generator system 302 (FIG. 3). In some embodiments, activity 1004 can be repeated one or more times.

In many embodiments, method 1000 can comprise activity 1005 of detecting a non-use interval of the water. In some embodiments, performing activity 1005 can be similar or identical to detecting a non-use interval of the water as described above with respect to system 300 (FIG. 3) and/or ozone generator system 302 (FIG. 3). In further embodiments, the non-use interval can be similar or identical to the non-use interval described above with respect to system 300 (FIG. 3) and/or ozone generator system 302 (FIG. 3). In some embodiments, activity 1005 can be repeated one or more times.

In many embodiments, method 1000 can comprise activity 1006 of generating the water with a water generating unit. In some embodiments, performing activity 1006 can be similar or identical to generating the water with a water generating unit as described above with respect to system 300 (FIG. 3) and/or water supply system 301 (FIG. 3). In further embodiments, the water generating unit can be similar or identical to water generating unit 306 (FIG. 3). In some embodiments, activity 1006 can be repeated one or more times.

In many embodiments, method 1000 can comprise activity 1007 of detecting a maintenance event at the water generating unit has been completed. In some embodiments, performing activity 1007 can be similar or identical to detecting a maintenance event at the water generating unit has been completed as described above with respect to system 300 (FIG. 3) and/or ozone generator system 302 (FIG. 3). In further embodiments, the maintenance event can be similar or identical to the maintenance event(s) described above with respect to system 300 (FIG. 3) and/or ozone generator system 302 (FIG. 3). In some embodiments, activity 1007 can be repeated one or more times.

In many embodiments, method 1000 can comprise activity 1008 of applying the ozone to an interior surface of a condenser of the water generating unit. In some embodiments, performing activity 1008 can be similar or identical to applying the ozone to an interior surface of a condenser of the water generating unit as described above with respect to system 300 (FIG. 3) and/or ozone generator system 302 (FIG. 3). In further embodiments, the condenser can be similar or identical to condenser 309 (FIG. 3). In some embodiments, activity 1008 can be repeated one or more times.

In many embodiments, method 1000 can comprise activity 1009 of applying the ozone to an interior surface of a desiccation device of the water generating unit. In some embodiments, performing activity 1008 can be similar or identical to applying the ozone to an interior surface of a desiccation device of the water generating unit as described above with respect to system 300 (FIG. 3) and/or ozone generator system 302 (FIG. 3). In further embodiments, the desiccation device can be similar or identical to desiccation device 308 (FIG. 3). In some embodiments, activity 1009 can be repeated one or more times.

In many embodiments, method 100 can comprise an activity of detecting present ozone proximal to where the ozone is to be applied to the water. In some embodiments, performing the activity of detecting the present ozone proximal to where the ozone is to be applied to the water can be similar or identical to detecting the present ozone proximal to where the ozone is to be applied to the water as described above with respect to system 300 (FIG. 3) and/or ozone generator system 302 (FIG. 3). In some embodiments, the activity of detecting present ozone proximal to where the ozone is to be applied to the water can be repeated one or more times.

In many embodiments, method 100 can comprise an activity of measuring a concentration of present ozone proximal to where the ozone is to be applied to the water. In some embodiments, performing the activity of measuring the concentration of present ozone proximal to where the ozone is to be applied to the water can be similar or identical to measuring the concentration of present ozone proximal to where the ozone is to be applied to the water as described above with respect to system 300 (FIG. 3) and/or ozone generator system 302 (FIG. 3). In some embodiments, the activity of measuring a concentration of present ozone proximal to where the ozone is to be applied to the water can be repeated one or more times.

In many embodiments, method 100 can comprise an activity of detecting micro-organisms proximal to where the ozone is to be applied to the water. In some embodiments, performing the activity of detecting the micro-organisms proximal to where the ozone is to be applied to the water can be similar or identical to detecting the micro-organisms proximal to where the ozone is to be applied to the water as described above with respect to system 300 (FIG. 3) and/or ozone generator system 302 (FIG. 3). In some embodiments, the activity of detecting micro-organisms proximal to where the ozone is to be applied to the water can be repeated one or more times.

In many embodiments, method 100 can comprise an activity of measuring a concentration of micro-organisms proximal to where the ozone is to be applied to the water. In some embodiments, performing the activity of measuring the micro-organisms proximal to where the ozone is to be applied to the water can be similar or identical to measuring the concentration of micro-organisms proximal to where the ozone is to be applied to the water as described above with respect to system 300 (FIG. 3) and/or ozone generator system 302 (FIG. 3). In some embodiments, the activity of measuring a concentration of micro-organisms proximal to where the ozone is to be applied to the water can be repeated one or more times.

Although the invention has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-13 may be modified, and that the foregoing discussion of certain of these embodiments does not necessarily represent a complete description of all possible embodiments. For example, one or more of the activities of the methods described herein may include different activities and be performed by many different elements, in many different orders. As another example, the elements within system 300 (FIG. 3) can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for providing water to a user for consumption comprising:
 a water generating unit to generate water;
 an ozone generator to generate ozone and apply the ozone to the water prior to use of the water by the user;
 a control system;
 wherein the control system is configured to control the generation of ozone by the ozone generator based on a non-use interval of the water generated by the water generating unit,
 wherein the non-use interval is a period of time set to prevent contaminants from building up in the water made available to the user of system between uses.

2. The system of claim 1 further comprising:
 a reservoir to store the water generated by the water generating unit; and,
 a filter configured to filter the water after the ozone is applied to the water.

3. The system of claim 1, wherein the ozone generator is configured to apply the ozone to an interior surface of the water generating unit.

4. The system of claim 1, wherein the water generating unit comprises:
 a heater configured to heat a regeneration fluid;
 a desiccation device configured to absorb water vapor from air and desorb water vapor into the regeneration fluid; and,
 a condenser configured to condense water vapor from the regeneration fluid to generate the water to be the water made available to the user.

5. The system of claim 4, wherein the heater comprises a solar thermal heater.

6. The system of claim 1, wherein the water generating unit comprises a solar panel to generate electricity to electrically power the water generating unit and the ozone generator.

7. The system of claim 4, further comprising a reservoir, wherein:
 the condenser is configured to extract water vapor from the regeneration fluid received from the desiccation device to generate liquid water; and,
 the reservoir is configured to receive the water extracted from the regeneration fluid by the condenser to provide the water to the user for consumption.

8. The system of claim 4, wherein the ozone generator is configured to apply the ozone to the heater, the desiccation device, the condenser, or a combination thereof.

9. The system of claim 1 wherein the control system is configured to receive a notification of when water is made available to the user from a water use sensor, and, wherein the control system is configured to track how much time has elapsed since receiving a most recent notification of when water made available to the user.

10. A method of providing water from a water generating unit to a user for consumption comprising:
 generating water with a water generating unit;
 generating, by a solar panel, electricity to electrically power the water generating unit and the ozone generator;
 generating ozone based on:
  when water generated by the water generating unit is received by the user for consumption; and,
  a non-use interval of the water generated by the water generating unit;
 applying the ozone to the water.

11. The method of claim 10, wherein the method further comprises:
 measuring an ambient temperature;
 detecting ozone;
 detecting micro-organisms;
 detecting a weather event;
 detecting a maintenance event; or, a combination thereof.

12. The method of claim 10, wherein the method further comprises:
 generating the ozone for a period of time at a time of day;
 preventing the ozone from being generated for a period of time at a time of day;

controlling, by a control system, a quantity of the ozone generated;

controlling, by a control system, when the ozone is generated;

controlling, by a control system, when the ozone is made available; or, a combination thereof.

13. A system for providing water to a user for consumption comprising:
   a water generating unit;
   an ozone generator; and,
   a control system configured to control the generation of ozone by the ozone generator based on a non-use interval of the water generated by the water generating unit; and,
   a solar panel to generate electricity to power the water generating unit, the control system and the ozone generator.

14. The system of claim 13, wherein the ozone generator is configured to apply the ozone generated to an interior surface of water generating unit.

15. The system of claim 13, wherein the control system is configured to control the generation of ozone based on a temperature, a weather event, or a combination thereof.

16. The system of claim 15, the control system is configured to control the generation of ozone based on a sensed temperature, a sensed weather event, a weather notification, or a combination thereof.

17. A system for providing water to a user for consumption comprising:
   a water generating unit;
   an ozone generator; and,
   a control system configured to control the generation of ozone by the ozone generator based on a non-use interval of the water generated by the water generating unit; and,
   wherein the ozone generator is configured to apply the ozone generated to an interior surface of water generating unit.

18. A system for providing water to a user for consumption comprising:
   a water generating unit comprising:
      a heater configured to heat a regeneration fluid,
      a desiccation device configured to absorb water vapor from air and desorb water vapor into the regeneration fluid, and,
      a condenser configured to condense water vapor from the regeneration fluid to generate the water to be the water made available to the user;
   an ozone generator; and,
   a control system configured to control the generation of ozone by the ozone generator based on a non-use interval of the water generated by the water generating unit.

19. The system of claim 18, wherein the water generating unit comprises a solar panel to generate electricity to electrically power the water generating unit and the ozone generator.

20. A system for providing water to a user for consumption comprising:
   a water generating unit;
   an ozone generator; and,
   a control system configured to control the generation of ozone by the ozone generator based on a non-use interval of the water generated by the water generating unit;
   wherein the control system is configured to:
      receive a notification of when water is made available to the user from a water use sensor, and,
      track how much time has elapsed since receiving a most recent notification of when water made available to the user.

* * * * *